US006239195B1

(12) United States Patent
Suzuki et al.

(10) Patent No.: US 6,239,195 B1
(45) Date of Patent: May 29, 2001

(54) THERMOPLASTIC RESIN COMPOSITION CONTAINING SILAN-TREATED FOLIATED PHYLLOSILICATE AND METHOD FOR PRODUCING THE SAME

(75) Inventors: Noriyuki Suzuki; Youichi Oohara, both of Settsu (JP)

(73) Assignee: Kaneka Corporation (JP)

( * ) Notice: Subject to any disclaimer, the term of this patent is extended or adjusted under 35 U.S.C. 154(b) by 0 days.

(21) Appl. No.: 09/180,546
(22) PCT Filed: May 13, 1997
(86) PCT No.: PCT/JP97/01605
  § 371 Date: Apr. 19, 1999
  § 102(e) Date: Apr. 19, 1999
(87) PCT Pub. No.: WO97/43343
  PCT Pub. Date: Nov. 20, 1997

(30) Foreign Application Priority Data

May 13, 1996 (JP) .................................................. 8/118074

(51) Int. Cl.[7] .................................................. C08K 9/02
(52) U.S. Cl. ........................ 523/204; 524/265; 524/267; 524/269
(58) Field of Search ............................ 523/204; 524/265, 524/267, 269

(56) References Cited

U.S. PATENT DOCUMENTS 5,384,196 * 1/1995 Inoue et al. ......................... 428/411.1
5,514,734   5/1996 Maxfield et al. ..................... 523/204

FOREIGN PATENT DOCUMENTS

| 2 048 285 | 12/1980 | (GB) . |
| 5-194851 | 8/1993 | (JP) . |
| 6-322249 | 11/1994 | (JP) . |
| 8-269321 | 10/1996 | (JP) . |
| WO 93/04118 | 3/1993 | (WO) . |
| WO 93/11190 | 6/1993 | (WO) . |
| WO 95/06090 | 3/1995 | (WO) . |
| WO 95/14733 | 6/1995 | (WO) . |

OTHER PUBLICATIONS

European Search Report dated Dec. 29, 1998.
International Search Report dated Jul. 23, 1997.
Written Opinion dated Dec. 9, 1997 (no translation).

* cited by examiner

*Primary Examiner*—Peter D. Mulcahy
(74) *Attorney, Agent, or Firm*—Baker Botts L.L.P.

(57) ABSTRACT

The present invention provides a thermoplastic resin composition containing a thermoplastic resin and a silane-treated foliated phyllosilicate, the silane-treated foliated phyllosilicate being prepared by introducing a predetermined organosilane compound into a swellable layered silicate. According to the present invention, the silane-treated foliated phyllosilicate is prepared by introducing the organosilane compound into the swellable layered silicate after the basal spacing of the swellable layered silicate has been expanded, and is exfoliated as a number of fine layers dispersed uniformly in the thermoplastic resin composition of the present invention independently from one another. Thus, the present invention provides a thermoplastic resin composition excellent in mechanical properties, heat resistance, and the surface appearance of the resultant molded product.

11 Claims, 2 Drawing Sheets

THERMOPLASTIC RESIN COMPOSITION CONTAINING SILAN-TREATED FOLIATED PHYLLOSILICATE AND METHOD FOR PRODUCING THE SAME

TECHNICAL FIELD

The present invention relates to a thermoplastic resin composition containing a thermoplastic resin and a silane-treated foliated phyllosilicate, and a method for producing the same.

BACKGROUND ART

In order to improved the mechanical properties, the heat resistance, and the like of a thermoplastic resin, a layered clay mineral such as talk and mica have been conventionally used as a filler (see Japanese Publication for Opposition No. 49-18615, Japanese Laid-Open Publication No. 55-16049, and Japanese Publication for Opposition No. 63-53222, for example). By adding a large amount of such layered clay mineral to a thermoplastic resin, the elastic modulus and the heat resistance of the resultant resin composition improves. However, a molded product obtained from the resin composition has the disadvantages of poor appearance, increased specific gravity, and poor color tone. Moreover, the strength, the tenacity, and the like of the resin composition are reduced due to insufficient dispersion of the layered clay mineral or insufficient adhesion between the layered clay mineral and the resin.

A surface treatment agent has generally been used for improving the adhesion between a filler and a resin to prevent the reduction of strength, impact strength, and the like of a resin composition. For example, a composite of a layered clay mineral treated with a silane coupling agent and a polyester resin is disclosed (see Japanese Laid-Open Publication No. 51-24653 and Japanese Laid-Open Publication No. 51-24654, for example). However, the conventional surface treatment method has not yet provided a sufficient effect of improving the strength and the like of the resin composition. Further, even if the surface of the layered clay was treated, the layered clay mineral itself still has an aggregate structure. Therefore, the problems of poor appearance, increase in the specific gravity, and poor color tone of the resultant molded product remained unsolved.

The layered clay mineral normally has an aggregate structure where about a hundred to several thousands of unit layers each having a thickness of about 1 nm are stratified. Therefore, in the above prior art technique, the layered clay mineral dispersed in the thermoplastic resin exists, not as foliated layers, but in the state of the aggregate structure.

If such an aggregate structure of the layered clay mineral could be exfoliated to allow unit layers to be dispersed separately in the thermoplastic resin, the resultant resin would be strengthened by the addition of only a small amount of the layered clay mineral, and the problems of the poor appearance, the increase in the specific gravity, and the poor color tone of the resultant molded product would be overcome. However, no technique that can exfoliated the layered clay mineral to the state of foliated unit layers to disperse the unit layers in the thermoplastic resin uniformly by use of a silane-coupling agent so as to obtain a resin composition having excellent properties has yet been provided.

DISCLOSURE OF THE INVENTION

The object of the present invention is to intend to solve the above-described conventional problems and provide a thermoplastic resin composition excellent in mechanical properties (elastic modulus, strength, impact strength, and the like), heat resistance, and appearance of a molded product by exfoliating an aggregate structure of a layered clay mineral to disperse the layered clay mineral as a number of separate thin layers each having a size of the order of nanometers independently.

As a result of intense examination for attaining the above object, the inventors of the present invention have completed the present invention.

The thermoplastic resin composition of the present invention contains a thermoplastic resin (A) and a silane-treated foliated phyllosilicate (B), wherein the silane-treated foliated phyllosilicate (B) is prepared by introducing a organosilane compound (B2) represented by general formula (I):

$$Y_n SiX_{4-n} \qquad (I)$$

wherein n denotes an integer of 0 to 3, Y denotes independently a substituted or non-substituted hydrocarbon group having 1 to 25 carbon(s), and X denotes independently a hydrolyzable group or a hydroxyl group, into a swellable layered silicate (B1), and a value $[R_{B300}]$ is 20% or more when the value $[R_{B300}]$ is defined as a rate of layers of the silane-treated foliated phyllosilicate (B) of which equivalent area circle diameter $[D]$ is 300 nm or less.

In one embodiment, the thermoplastic resin (A) is at least one type selected from the group consisting of a thermoplastic polyester resin and a polycarbonate resin.

In another embodiment, the swellable layered silicate (B1) is at least one type selected from the group consisting of smectite clay and swellable mica.

In still another embodiment, the silane-treated foliated phyllosilicate (B) is prepared by introducing the organosilane compound (B2) after the basal spacing of the swellable layered silicate (B1) has been expanded.

In still another embodiment, the content of the silane-treated foliated phyllosilicate (B) is 0.1 to 100 parts by weight with respect to 100 parts by weight of the thermoplastic resin (A).

In still another embodiment. the ash content originated from the silane-treated foliated phyllosilicate (B) is 0.1 to 50% by weight.

In a preferred embodiment, the value $[R_{B300}]$ is 500 nm or less when the $[D_B]$ is defined as an average value of the equivalent area circle diameters of the silane-treated foliated phyllosilicate (B).

In still another embodiment, a value $[D_B]/[D_{B1}]$ is 0.010 or less when the value $[D_B]$ is defined as an average value of the equivalent area circle diameters of the silane-treated foliated phyllosilicate (B) and the value $[D_{B1}]$ is defined as an average value of the equivalent area circle diameters of the swellable layered silicate (B1).

In still another embodiment, a value $[N_B]/[N_{B1}]$ is 300 or more when the value $[N_B]$ is defined as the number of foliated layers of the silane-treated foliated phyllosilicate (B) per unit ash content and per unit area, and the value of $[N_{B1}]$ is defined as the number of the swellable layered silicate (B1) per unit ash content and per unit area.

In still another embodiment, an average thickness of the foliated layers of the silane-treated foliated phyllosilicate (B) dispersed in the thermoplastic resin composition is 20 nm or less.

In still another embodiment, 20% or more of layers of the silane-treated foliated phyllosilicate (B) dispersed in the thermoplastic resin composition have a layer thickness of 5 nm or less.

In still another embodiment, a value $[I_B]/[I_B]$ is 0.25 or less when the value $[I_B]$ is defined as a diffraction intensity of the small angle X-ray diffraction originated from the silane-treated foliated phyllosilicate (B), and the value $[I_B]$ is defined as a diffraction intensity of small angle X-ray diffraction originated from an aggregate structure of the swellable layered silicate (B1).

In still another embodiment, the basal spacing of the silane-treated foliated phyllosilicate (B) in the thermoplastic resin composition is three times or more as large as an initial basal spacing of the swellable layered silicate (B1).

According to another aspect of the present invention, the thermoplastic resin composition of the present invention contains a thermoplastic resin (A) and a silane-treated foliated phyllosilicate (B), wherein the silane-treated foliated phyllosilicate (B) is prepared by introducing a organosilane compound (B2) represented by general formula (I);

wherein n denotes an integer of 0 to 3, Y denotes independently a substituted or non-substituted hydrocarbon group having 1 to 25 carbon(s), and X denotes independently a hydrolyzable group or a hydroxyl group, into a swellable layered silicate (B1) after the basal spacing of the swellable layered silicate (B1) has been expanded.

According to still another aspect of the present invention, the thermoplastic resin composition of the present invention contains a thermoplastic resin (A) and a silane-treated foliated phyllosilicate (B), wherein the silane-treated foliated phyllosilicate (B) is prepared by introducing a organosilane compound (B2) represented by the above general formula (I) into a swellable layered silicate (B1), and an average thickness of the foliated layers of the silane-treated foliated phyllosilicate (B) dispersed in the thermoplastic resin composition is 20 nm or less.

According to still another aspect of the present invention, the thermoplastic resin composition of the present invention contains a thermoplastic resin (A) and a silane-treated foliated phyllosilicate (B), wherein the silane-treated foliated phyllosilicate (B) is prepared by introducing a organosilane compound (B2) represented by the above general formula (I) into a swellable layered silicate (B1), and 20% or more of layers of the silane-treated foliated phyllosilicate (B) dispersed in the thermoplastic resin composition has a layer thickness of 5 nm or less.

According to still another aspect of the present invention, the thermoplastic resin composition of the present invention contains a thermoplastic resin (A) and a silane-treated foliated phyllosilicate (B), wherein the silane-treated foliated phyllosilicate (B) is prepared by introducing a organosilane compound (B2) represented by the above general formula (I) into a swellable layered silicate (B1), and a value $[I_B]/[I_{B1}]$ is 0.25 or less when the value $[I_B]$ is defined as a diffraction intensity of small angle X-ray diffraction originated from the silane-treated foliated phyllosilicate (B), and the value $[I_{B1}]$ is defined as a diffraction intensity of small angle X-ray diffraction originated from an aggregate structure of the swellable layered silicate (B1).

According to still another aspect of the present invention, the thermoplastic resin composition of the present invention contains a thermoplastic resin (A) and a silane-treated foliated phyllosilicate (B), wherein the silane-treated foliated phyllosilicate (B) is prepared by introducing a organosilane compound (B2) represented by the above general formula (I) into a swellable layered silicate (B1), and the basal spacing of the silane-treated foliated phyllosilicate (B) in the thermoplastic resin composition is three times or more as large as an initial basal spacing of the swellable layered silicate (B1).

The method for producing a thermoplastic resin composition containing a thermoplastic resin (A) and a silane-treated foliated phyllosilicate (B) of the present invention includes the steps of: expanding the basal spacing of the swellable layered silicate (B1); and introducing a organosilane compound (B2) represented by the general formula (I):

wherein n denotes an integer of 0 to 3, Y denotes independently a substituted or non-substituted hydrocarbon group having 1 to 25 carbon(s), and X denotes independently a hydrolyzable group or a hydroxyl group, into the swellable layered silicate (B1) of which basal spacing has been expanded, to prepare the silane-treated foliated phyllosilicate (B).

In one embodiment, the method for producing a thermoplastic resin composition of the present invention further includes the steps of: mixing the silane-treated foliated phyllosilicate (B) with a monomer to obtain a mixture; and polymerizing the monomer in the mixture to obtain the thermoplastic resin (A).

BEST MODE FOR CARRYING OUT THE INVENTION

Figure 1:
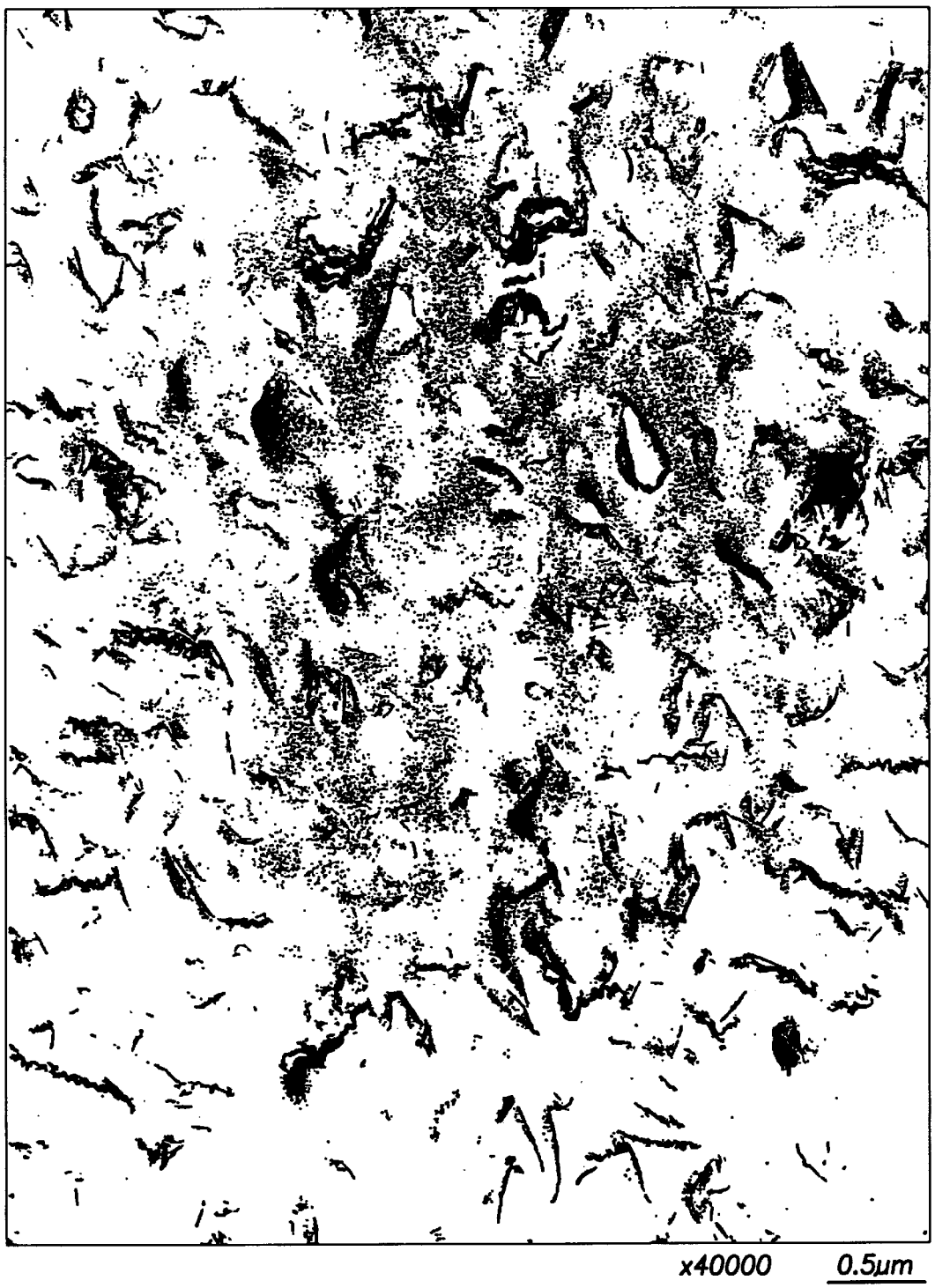
FIG. 1 is a photograph taken by a transmission electronic microscope showing a morphology of a silane-treated foliated phyllosilicate (B) of a thermoplastic polyester resin composition (C) obtained in Example 1.

The thermoplastic resin (A) used in the present invention can be any arbitrary thermoplastic resin. Examples of such a thermoplastic resin (A) include arbitrary thermoplastic resins such as thermoplastic polyester resins, polycarbonate resins, polyamide resins, polyolefin resins, polyarylate resins, vinyl polymer compounds, polyimide resins, polyphenylene sulfides, polyphenylene oxides, polyacetal, polysulfone, polyether sulfones, fluororesins, and polyolefin copolymers. The thermoplastic resin may be an elastomer or a rubber. One type or combinations of two or more types among these thermoplastic resins may be used. Thermoplastic polyester resins, polycarbonate resins, polyamide resins, and polyolefin resins are preferable. Thermoplastic polyester resins and polycarbonate resins are especially preferable.

The thermoplastic polyester resin is not specifically limited, but may be any arbitrary polyester resin prepared from, but not limited to, a dicarboxylic acid compound and/or an esterificationable derivative of dicarboxylic acid, and a diol compound and/or an esterificationable derivative of a diol compound. Specific examples of such a polyester resin include polyethylene terephthalate, polypropylene terephthalate, polybutylene terephthalate, polyhexamethylene terephthalate, polycyclohexane-1,4-dimethyl terephthalate, neopentyl terephthalate, polyethylene isophthalate, polyethylene naphthalate, polybutylene naphthalate, polyhexamethylene naphthalate, and copolymer polyesters thereof. These resins may be used individually or in combinations of two or more types.

The polycarbonate resin is not specifically limited, but may be any arbitrary polycarbonate resin obtained by the reaction between a bivalent phenol compound and phosgene or between a bivalent phenol compound and a carbonic acid diester compound. Specific examples of such a polycarbonate resin include 2,2-bis-(4-hydroxyphenyl)propane type polycarbonate, 2,2-bis-(3,5-dimetyl-4-hydroxyphenyl) propane type polycarbonate, 1,1-bis(4-hydroxyphenyl) cyclohexane type polycarbonate, 4,4'-dihydroxyphenyl ether type polycarbonate, 4,4'-dihydroxydiphenyl sulfide type polycarbonate, 4,4'-dihydroxydiphenyl sulfone type polycarbonate, bis(4-hydroxyphenyl)ketone type polycarbonate, and 1,4-bis(4-hydroxyphenylsulfonyl) benzene. These resins may be used individually or in combinations of two or more types.

The polyamide resin is not specifically limited, but may be any arbitrary polyamide resin. Specific examples of the polyamide resin included polycaproamide (Nylon 6), polytetramethylene adipamide (Nylon 46), polyhexaethylene adipamids (Nylon 66), polyhexamethylene sebacamide (Nylon 610), polyhexamethylene dodecamide (Nylon 612), polyundecamethylene adipamide (Nylon 116), polyundecamide (Nylon 11), polydodecamide (Nylon 12), polytrimethlhexamethylene terephthalamide (TMHT), polyhexamethylene terephthalamide (Nylon 6T), polyhexamethylene isophthalamide (Nylon 6I), polybis (4-aminocyclohexyl) methanedodecamide (Nylon dimethyl PACM12), polymethaxylylene adipamide (Nylon MXD6), polyundecamethylene hexahydroterephthalamide (Nylon 11TH), and copolymers thereof. These resins may be used individually or in combinations of two or more types.

The polyolefin resin is not specifically limited, but may be any arbitrary polyolefin. Examples of the polyolefin include homopolymers of α-olefins including ethylene, a copolymer of two or more types of α-olefin (which includes any of a random copolymer, a block copolymer, a graft copolymer, and the like, and may be a mixture thereof), and olefin elastomers. Examples of the ethylene homopolymer includes low-density polyethylene (LDPE), high-density polyethylene (HDPE), and linear low-density polyethylene (LLDPE). Examples of polypropylene include not only a polypropylene homopolymer but also a copolymer of propylene and ethylene. The polyethylene and the polypropylene may include olefin elastomers. The olefin elastomer refers to a copolymer of ethylene and at least one type of α-olefin other than ethylene (e.g., propylene, 1-butene, 1-hexene, and 4-methyl-1-pentene). Specific examples of the olefin elastomer include ethylene-propylene copolymers (EPR), ethylene-butene copolymers (EBR), and ethylene-propylene-diene copolymers (EPDM). These copolymers may be used individually or in combination of two or more types.

The molecular weight of the thermoplastic resin (A) used in the present invention is selected in consideration of the molding flowability of the resin in the molding process and the properties of the final products. Excessively large and small molecular weights are not preferable. An optimal molecular weight is mainly determined based on the primary structure of the thermoplastic resin (A). Accordingly, a molecular weight suitable for each type of thermoplastic resin (A) should be set.

The molecular weight of a thermoplastic polyester resin which can be suitably used in the present invention is set so that the logarithmic viscosity is 0.3 to 2.0 (dl/g), preferably 0.35 to 1.0 (dl/g), more preferably 0.4 to 1.8 (dl/g), as measured using a mixed solvent of phenol/tetrachloroethane (weight ratio: 5/5) at 25° C. If the logarithmic viscosity is less than 0.3 (dl/g), the molded product of the resultant thermoplastic resin composition (C) tends to have low mechanical properties and impact resistance. If it exceeds 2.0 (dl/g), the processability such as the flowability in the molding process tends to be reduced.

The molecular weight of a polycarbonate resin which can be suitably used in the present invention is set so that the weight average molecular weight (Mw) is 15000 to 80000, preferably 25000 to 75000, more preferably 30000 to 70000, in terms of monodisperse polystyrene, as measured by gel permeation chromatography (GPC) using a tetrahydrofuran (THF) solvent at 40° C. If Mw is less than 15000, the molded product of the resultant thermoplastic resin composition (C) tends to have low mechanical properties and impact resistance. If it exceeds 80000, the processability such as the flowability in the molding process tends to be reduced.

The molecular weight of a polyamide resin which can be suitably used in the present invention is desirably set so that the relative viscosity of 1.0% polyamide resin is 1.5 to 5.0 as measured using a 98% concentrated sulfuric acid at 25° C. If the relative viscosity is less than 1.5, the molded product of the resultant thermoplastic resin composition (C) tends to have low mechanical properties and impact resistance. If it exceeds 5.0, the processability such as the flowability in the molding process tends to be reduced.

Among said polyolefin resins, the molecular weight of polypropylene is desirably set so that the melt index is preferably 0.3 to 30 g/10 minutes, more preferably 0.5 to 15 g/10 minutes, as measured under a load of 2.16 Kg at 230° C., for example. If the melt index exceeds 30 g/10 minutes, the processability such as the flowability in the molding process tends to be reduced.

Silane-Treated Foliated Phyllosilicate (B)

The silane-treated foliated phyllosilicate (B) used in the present invention refers to those prepared by introducing a organosilane compound (B2) represented by general formula (I):

$$Y_n SiX_{4-n} \qquad (I)$$

wherein n denotes an integer of 0 to 3, Y denotes independently a substituted or non-substituted hydrocarbon group having 1 to 25 carbon(s), and X denotes independently a hydrolyzable group or a hydroxyl group, into a swellable layered silicate (B1).

Swellable Layered Silicate (B1)

The swellable layered silicate (B1) may be any arbitrary swellable layered silicate normally used. Preferably, a silicate formed of a tetrahedral crystalline sheet mainly made of silicon oxide and an octahedral crystalline sheet mainly made of metal hydroxide are used. Examples of the swellable layered silicate include smectite clay and swellable mica.

The smectite clay is a natural or synthetic mineral represented by the general formula:

$$X_{0.2-0.6}Y_{2-3}Z_4O_{10}(OH)_2 \cdot nH_2O$$

wherein X denotes at least one type selected from the group consisting of K, Na, ½Ca, and ½Mg, Y denotes at least one type selected from the group consisting of Mg, Fe, Mn, Ni, Zn, Li, Al, and Cr, and Z denotes at least one type selected from the group consisting of Si and Al, $H_2O$ represents a water molecule which binds with an intercalated ion, and n markedly varies depending on the intercalated ion and the relative humidity. Specific examples of the smectite clay include montmorillonite, beidellite, nontronite, saponite, iron saponite, hectorite, sauconite, stevensite, bentonite, substituents or derivatives thereof, and mixtures thereof.

The swellable mica is a natural or synthetic mineral represented by the general formula:

$$X_{0.5-1.0}Y_{2-3}Z_4O_{10}(F, OH)_2$$

wherein X denotes at least one type selected from the group consisting of Li, Na, K, Rb, Ca, Ba, and Sr, Y denotes at least one type selected from the group consisting of Mg, Fe, Ni, Mn, Al, and Li, Z denotes at least one type selected from the group consisting of Si, Ge, Al, Fe, and B. The swellable mica has the nature of swelling in water, a polar solvent soluble with water at an arbitrary ratio, or a mixed solvent of water and a polar solvent. Examples of the swellable mica include lithium type teniolite, sodium type teniolite, lithium type tetrasilicon mica, and sodium type tetrasilicon mica, substituents and derivatives thereof, and mixtures thereof.

Vermiculites may also be used as the swellable mica. The vermiculites have two types: a 3-octahedron type and 2-octahedron type, and is represented by the general formula:

$$(Mg, Fe, Al)_{2-3}(Si_{4-x}Al_x)O_{10}(OH)_2 \cdot (M^+, M^{2+}_{1/2})_x \cdot nH_2O$$

where M denotes an exchangeable cation of an alkaline metal or alkaline earth metal such as Na and Mg, x denotes 0.6 to 0.9, and n denotes 3.5 to 5.

The swellable layered silicate (B1) is used individually or in combinations of two or more types. The crystal structure of the swellable layered silicate (B1) is desirably a structure with a high purity where layers are stratified regularly in the c-axis direction. However, a so-called mixed layer mineral where the crystal cycle is disturbed to allow a plurality of types of crystal structures to be mixed may also be used.

Organosilane Compound (B2)

the organosilane compound (B2) to be introduced into the swellable layered silicate (B1) may be any arbitrary organosilane compound preferably represented by general formula (I):

$$Y_n SiX_{4-n} \tag{I}$$

wherein n denotes an integer of 0 to 3; Y is independently a substituted or non-substituted hydrocarbon group having 1 to 25 carbon(s), the substituent being at least one type selected from the group consisting of an ester group, and ether group, and epoxy group, an amino group, a carboxyl group, a carbonyl group, an amide group, a mercapto group, a sulfonyl group, sulfinyl group, a nitro group, a nitroso group, a nitrile group, a halogen atom, and a hydroxyl group; and X is independently a hydrolyzable group or a hydroxyl group, the hydrolyzable group being at least one type selected from the group consisting of an alkoxyl group, alkenyloxy group, a ketoxime group, an acyloxy group, an amino group, an aminoxy group, an amido group, and a halogen atom. The n Y's and 4-n X's may be respectively the same type or different types.

The hydrocarbon group as used herein includes a linear or branched (i.e., having a side chain), saturated or unsaturated, univalent or multivalent aliphatic hydrocarbon group, an aromatic hydrocarbon group, and an alicyclic hydrocarbon group. Examples of the hydrocarbon group include an alkyl group, an alkenyl group, an alkinyl group, an aryl group (a phenyl group, a naphthyl group, etc.), and a cycloalkyl group.

The "alkyl group" as used herein is intended to include a multivalent hydrocarbon group such as an "alkylene" group unless otherwise specified. Likewise, the alkenyl group, the alkynyl group, the aryl group (the phenyl group, the naphthyl group, etc.), and the cycloalkyl group, an arylene group (a phenylene group, a naphthylene group, etc,), and a cycloalkylene group, respectively.

In general formula (I) above, examples of the compound where Y is a non-substituted hydrocarbon group having 1 to 25 carbons such as decyltrimethoxy silane; a compound where Y is a lower alkyl group having 1 to 9 carbon(s) such as methyltrimethoxy silane; a compound where Y is an unsaturated hydrocarbon group such as 2-hexenyltrimethoxy silane; a compound where Y has a side chain such as 2-ethylhexyltrimethoxy silane; a compound where Y includes a phenyl group such as phenyltriethoxy silane; a compound where Y includes a naphthyl group such as 3-β-naphtylpropyltrimethoxy silane; and a compound where Y includes an arylalkyl group such as p-vinylhbenzltrimethoxy silane. In general formula (I) above, examples of a compound where Y is especially a vinyl group among the unsaturated hydrocarbon groups include vinyltrimethoxy silane, vinyltrichloro silane, and vinyltriacetoxy silane.

In general formula (I) above, an example of a compound where Y is a group having an ester group having an ether group as a substituent include γ-polyoxyethylenepropyltrimethoxy silane and 2-ethoxyethyltrimethoxy silane. An example of a compound where Y is a group having an epoxy group as a substituent includes γ-glycidoxypropyltrimethoxy silane. Examples of a compound where Y is a group having an amino group as a substituent include γ-aminopropyltrimethoxy silane, γ-2-aminoethyl)aminopropyltrimethoxy silane, and γ-anilinopropyltrimethoxy silane $(NH_2C_6H_4(CH_2)_3Si(OCH_3)_3)$. An example of a compound where Y is a group having a carboxyl group as a substituent includes γ-4-carboxyphenyl)propyltrimethoxy silane. An example of a compound where Y is a group having a carbonyl group as a substituent includes γ-ureidopropyltriethoxy silane $(H_2NCONH(CH_2)_3Si(OC_2H_5)_3)$. An example of a compound where Y includes an amido group as a substituent includes an acetylated compound from among the above-mentioned compound having an amino group. An example of a compound where Y is a group having a mercapto group as a substituent includes γ-mercaptopropyltrimethoxy silane. An example of a compound where Y is a group having a sulfonyl group as a substituent includes γ-phenylsulfonylpropyltrimethoxy silane. An example of a compound where Y is a group having a sulfinyl group as a substituent includes γ-phenylsulfinylpropyltrimethoxy silane. An example of a compound where Y is a group having a nitro group as a substituent includes γ-nitropropyltriethoxy silane. An example of a compound where Y is a group having a nitroso group as a substituent includes γ-nitrosopropyltriethoxy silane. Examples of a compound where Y is a group having a nitryl group as a substituent include γ-cyanoethyltriethoxy silane and γ-cyanopropyltriethoxy silane. An example of a compound where Y is a group having a halogen as a substituent includes γ-chloropropyltriethoxy silane. An example of a compound where Y is a group having a hydroxyl group as a substituent includes N,N-di(2-hydroxyethyl)amino-3-propyltriethoxy silane.

In general formula (I) above, when X is a hydroxyl group, the hydroxyl group is in the form of a silanol group (SiOH). An example of the organosilane compound (B2) having a silanol group includes an oligomer of dimethylhydroxy silane represented by the formula below. In view of the reactivity with the swellable layered silicate (B1) and the convenience in handling of the organosilane compound (B2) itself, m is preferably an integer of 2 to 30.

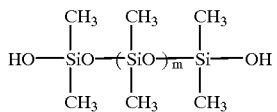

A substitution product or derivative of the organosilane compound (B2) may also be used. These organosilane compounds (B2) may be used individually or in combinations of two or more types.

Preparation of Silane-Treated Foliated Phyllosilicate (B)

The silane-treated foliated phyllosilicate (B) can be obtained by introducing the organosilane compound (B2) into the swellable layered silicate (B1) after the basal spacing of the swellable layered silicate (B1) is expanded.

The basal spacing as used herein refers to a interlayer distance between adjacent unit layers of the swellable layered silicate or the resultant silane-treated foliated phyllosilicate. Actually, the basal spacing can be confirmed by a small angle X-ray diffraction (SAXS) method and the like. More specifically, the peak angle value of the X-ray diffraction performed for a dispersion composed of a dispersion medium and the swellable layered silicate (B1) (or for the swellable layered silicate in the aggregate state before being added to the dispersion medium) is measured by SAXS, and the basal spacing is calculated by using the resultant peak angle value and Bragg equation:

$$2d \sin \theta = n\lambda$$

wherein d denotes the basal spacing in a crystal, $\theta$ denotes an incident angle, n denotes a positive integer, and $\lambda$ denotes the wavelength of the X ray.

The step of expanding the basal spacing of the swellable layered silicate (B1) is performed by dispersing the swellable layered silicate (B1) in the dispersion medium or by applying an external physical force to the swellable layered silicate (B1).

In the case where the dispersion medium is used, water, a polar solvent soluble with water at any arbitrary ratio, or a mixed solvent of water and the polar solvent may be used as the dispersion medium. Examples of the polar solvent include: alcohols such as methanol, ethanol, and isopropanol; glycols such as ethylene glycol, propylene glycol, and 1,4-butanediol; ketones such as acetone and methylethyl ketone; ethers such as diethylether and tetrahydrofuran; amido compounds such as dimethylformamide; and other solvents such as dimethylsulfoxide and 2-pyrrolidone. These polar solvents may be used individually or in combinations of two or more types.

The expansion of the basal spacing of the swellable layered silicate (B1) in the dispersion medium may be achieved by dispersing the swellable layered silicate (B1) in the dispersion medium through sufficient agitation. In order to efficiently expand the basal spacing of the swellable layered silicate, the mixture of the swellable layered silicate and the dispersion medium is preferably agitated at several thousand revolutions per minute.

In the case where an external physical force is applied to the swellable layered silicate (B1) to exfoliate unit layers from adjacent unit layers, the external physical force may be applied by a general filler wet pulverization method. An example of the general filler wet pulverization method includes a method where hard particles are utilized. According to this method, hard particles, the swellable layered silicate (B1), and any arbitrary solvent are mixed and agitated to allow the hard particles and the swellable layered silicate (B1) to physically collide with each other and thus to separate unit layers of the swellable layered silicate (B1) from one another. The hard particles normally used are beads for filler pulverization. Examples of such beads include glass beads and zirconia beads. These beads for pulverization are not limited to glass and zirconia, but may be selected in consideration of the hardness of the swellable layered silicate (B1) or the material of the agitator. The particle size of the beads is preferably in the range of 0.1 to 6.0 mm dia. although it is not numerically limited since it is determined in consideration of the size of the swellable layered silicate (B1) and the like. The solvent used in this step is not specifically limited, but is preferably of a similar type to the dispersion medium described above.

The basal spacing between adjacent layers of the swellable layered silicate (B1) after the expansion is preferably three times or more, more preferably five times or more, as large as the initial basal spacing of the swellable layered silicate (B1). An upper limit is not especially set. However, if the basal spacing is expanded by about ten times or more, the measurement of the basal spacing becomes difficult. The layers of the swellable layered silicate (B1) having such a basal spacing are substantially recognized as existing as unit layers. The initial basal spacing of the swellable layered silicate as used herein refers to the basal spacing of the swellable layered silicate before being added to the dispersion medium where unit layers are stratified on one another in the aggregate state.

After the basal spacing of the swellable layered silicate (B1) has been expanded as described above, i.e., the unit layers in the aggregate state have been exfoliated to separate from one another so that they exist independently, the organosilane compound (B2) is introduced to the surfaces of the unit layers of the foliated swellable layered silicate (B1), so as to obtain the silane-treated foliated phyllosilicate (B).

In the case of suing the dispersion medium the introduction of the organosilane compound is performed by adding the organosilane compound (B2) to the dispersion containing the swellable layered silicate (B1) having an expanded basal spacing and the dispersion medium and agitating the dispersion. When an efficient introduction of the organosilane compound (B2) is desired, the revolution of the agitation is preferably set at 1000 rpm or more, or the shear rate is preferably set at 500 (1/s) or more. Since the agitation at a revolution exceeding 25000 rpm or the shear rate of 500000 (1/s) or more is likely to provide no further improved effect, such excessive number of revolutions or shear rate is not required. In the case of applying an external physical force, the organosilane compound (B2) can be introduced by adding the organosilane compound (B2) to the swellable layered silicate (B1) while the swellable layered silicate is being applied with an external physical force (e.g., it is being wet-pulverized). Alternatively, the organosilane compound (B2) may be introduced in the following manner: The swellable layered silicate (B1) of which basal spacing has been expanded due to an external physical force is added to the dispersion medium, and the organosilane compound (B2) is added to the resultant dispersion as in the case of using the dispersion medium described above.

The introduction of the organosilane compound (B2) to the swellable layered silicate (B1) is realized by the reaction between the hydroxyl group on the surface of the swellable layered silicate (B1) and the hydrolyzable group or the hydroxyl group (X in formula (II)) of the organosilane compound (B2). Although the reaction between the swellable layered silicate (B1) and the organosilane compound (B2) can proceed at room temperature satisfactorily, the reaction system may be heated as required. The maximum temperature for this heating may be set at any arbitrary temperature of less than the decomposition temperature of the organosilane compound (B2) used and less than the boiling point of the dispersion medium.

when the organosilane compound (B2) introduced into the swellable layered silicate (B1) additionally includes a reactive functional group (a substituent of Y in formula (I)) such as an hydroxyl group, a carboxyl group, an amino group, an epoxy group, or a vinyl group, a compound which can react with such a reactive group may be further added to allow the compound to react with the reactive group. In this way, the length of a functional group chain of the organosilane compound (B2) introduced into the swellable layered silicate (B1) can be increased, and the polarity thereof can be modified. In the above case, the compound to be added may be, but is not limited to, the organosilane compound (B2) itself. Otherwise, any arbitrary compound may be used depending on the purpose. Examples of such a compound include an epoxy group containing compound, an amino group containing compound, a carboxyl group containing compound, an acid anhydride group containing compound, and a hydroxyl group containing compound.

The amount of the organosilane compound (B2) used may be adjusted so that the affinity and the dispersiveness between the resultant silane-treated foliated phyllosilicate (B) and the resin (A) used. If required, a plurality of types of organosilane compounds (B2) having different functional groups may be used together. Accordingly, the added amount of the organosilane compound (B2) is not simply numerically limited, but preferably it is in the range of 0.1 to 200 parts by weight, more preferably in the range of 0.2 to 160 parts by weight, especially preferably in the range of 0.3 to 120 parts by weight, with respect to 100 parts by weight of the swellable layered silicate (B1). If the amount of the organosilane compound (B2) is less than 0.1 parts by weight, the fine dispersion effect of the resultant silane-treated foliated phyllosilicate (B) tends to become insufficient. Even if it exceeds 200 part by weight, the effect improves no more. The addition exceeding 200 parts by weight is therefore unnecessary, The basal spacing of the silane-treated foliated phyllosilicate (B) obtained in the manner described above can be expanded compared with the initial basal spacing of the swellable layered silicate (B1) due to the presence of the introduced organosilane compound (B2). For example if the organosilane compound (B2) is not introduced, the swellable layered silicate (B1), of which the basal spacing has been expanded by being dispersed in the dispersion medium, will resume the original state where the unit layers aggregate with one another when the dispersion medium is removed. According to the present invention, however, by introducing the organosilane compound (B2) after the expansion of the basal spacing, the resultant silane-treated foliated phyllosilicate (B) can remain in the state where the basal spacing is expanded without the aggregation of the unit layers. The basal spacing of the silane-treated foliated phyllosilicate (B) is preferably expanded from the initial basal spacing of the swellable layered silicate (B1) by 1.5 times or more, more preferably by two times or more.

The introduction of the organosilane compound (B2) into the swellable layered silicate (B1) can be confirmed by a variety of methods. For example, the following method can be used for the confirmation. First, the silane-treated foliated phyllosilicate (B) is washed and rinsed using an organic solvent such as tetrahydrofuran and chloroform, to remove the organosilane compound (B2) which simply adsorbs to the silane-treated foliated phyllosilicate. After the wash, the silane-treated foliated phyllosilicate (B) is powdered with a mortar and the like and dried. The resultant silane-treated foliated phyllosilicate (B) is sufficiently mixed with powdered potassium bromide (KBr) at a predetermined ratio, and the mixture is pressed to obtain tablets. Then, an absorption band originated from the organosilane compound (B2) is measured by a transmission method using Fourier transform infrared spectrum (FT-IR). If an accurate measurement is desired or the amount of organosilane compound (B2) is small, the fully dried powdered silane-treated foliated phyllosilicate (B) itself is desirably measured by a diffuse reflectance infrared spectroscopy (DRIFT).

The expansion of the basal spacing of the silane-treated foliated phyllosilicate (B) from the initial basal spacing of the swellable layered silicate (B1) can be confirmed by a variety of methods. For example, the following method can be used for the confirmation. That is, as described above, the silane-treated foliated phyllosilicate (B) is first washed and rinsed using an organic solvent to remove the organosilane compound (B2) which is adsorbed to the silane-treated foliated phyllosilicate, and then dried. Then, the expansion of the basal spacing can be confirmed by the small angle X-ray diffraction (SAXS) method and the like. According to this method, the peak angle value of the X-ray diffraction originated from the (001) plane of the powdered silane-treated foliated phyllosilicate (B) is measured by SAXS, and the Bragg equation is calculated using the resultant peak angle value, to obtain the basal spacing. The initial basal spacing of the swellable layered silicate (B1) is also measured in the same manner. These basal spacing are compared with each other to confirm the expansion of the basal spacing.

As described above, the generation of the silane-treated foliated phyllosilicate (B) can be confirmed by confirming the introduction of the organosilane compound (B2) and the expansion of the basal spacing. In this way, according to the present invention, the affinity between the silane-treated foliated phyllosilicate (B) and the resin as a matrix can be enhanced by the introduction of the organosilane compound (B2) and the expansion of the basal spacing.

Preparation of Thermoplastic Resin Composition (C)

The thermoplastic resin composition (C) of the present invention is prepared so that the mixing amount of the silane-treated foliated phyllosilicate (B) is typically 0.1 to 100 parts by weight, preferably 0.2 to 85 parts by weight, more preferably 0.5 to 0 parts by weight, with respect to 100 parts by weight of the thermoplastic resin (A). If the mixing amount of the silane-treated foliated phyllosilicate (B) is less than 0.1 parts by weight, the effect of improving the mechanical properties and the heat resistance is insufficient in some cases. If it exceeds 150 parts by weight, the appearance of a molded product, the flowability in the molding process, and the like tend to be degraded. The mixing amount is not limited to the above-described range since it can be appropriately selected depending on the final usage of the thermoplastic resin composition (C).

The thermoplastic resin composition (C) of the present invention is prepared so that the ash content of the thermoplastic resin composition (C) originated from the silane-treated foliated phyllosilicate (B) is typically 0.1 to 50% by weight, preferably 0.2 to 45% by weight, more preferably 0.5 to 40% by weight. If the ash content is less than 0.1% by weight, the effect of improving the mechanical properties and the heat resistance is insufficient in some cases. If it exceeds 50% by weight, the appearance of a molded product, the flowability in the molding process, and the like tend to be degraded.

The thermoplastic resin composition (C) may be produced by a method including the steps of preparing a mixture by mixing the previously prepared silane-treated foliated phyllosilicate (B) and a monomer (mixing step), and polymerizing the monomer in the resultant mixture to obtain the thermoplastic resin (A) (polymerization step).

The monomer used in the above method may be any arbitrary monomer normally used for preparing a desired thermoplastic resin (A). The above-described dispersion medium used for the preparation of the silane-treated foliated phyllosilicate (B) and the monomer used may be the same.

When the thermoplastic resin (A) is a polyester resin, the monomer used may include: an acid component having dicarboxylic acid and/or an esterificationable derivative thereof as a main component; and a diol component having a diol compound and/or an esterificationable derivative thereof as a main component.

The dicarboxylic acid is preferably an aromatic dicarboxylic acid. Examples of the aromatic dicarboxylic acid include terephthalic acid, isophthalic acid, orthophthalic acid, 2,5-naphthalene dicarboxylic acid, 4,4'-biphenyl dicarboxylic acid, 4,4'-diphenylether dicarboxylic acid, 4,4'-diphenylmethane dicarboxylic acid, 4,4'-diphenylsulfone dicarboxylic acid, and 4,4'-diphenylisopropylidene dicarboxylic acid. Substituents and derivatives thereof may also be used. Oxyacids such as p-oxybenzoic acid and p-hydroxyethoxybenzoic acid, and esterificationable derivatives thereof may be used. A mixture of two or more types of these monomers may be used. One or more type(s) of aliphatic dicarboxylic acids such as adipic acid, azelaic acid, dodecanoic diacid, and sebacic acid may be mixed together with the above aromatic dicarboxylic acid, as long as the mixed amount is too small to degrade the properties of the resultant polyester resin.

Examples of the diol component include: aliphatic diols such as ethylene glycol, propylene glycol, butylene glycol, hexylene glycol, neopentyl glycol; alicyclic diols such as 1,4-cyclohexanedimethanol; and aromatic diols such as 2,2-bis(4-hydroxyphenyl)propane. Substituents and derivatives thereof may also be used. A mixture of two or more types of these may also be used. At least one type of long-chain diols (e.g., polyethylene glycol and polytetramethylene glycol), and alkylene oxide added polymers of bisphenols (e.g., an ethylene oxide added polymer of bisphenol A) may also be mixed, as long as the mixed amount is too small to degrade the properties of the resultant polyester resin.

A cyclic ester such as ε-caprolactone may also be used as the monomer.

When the thermoplastic resin (A) is a polycarbonate resin, the monomer used may include: a bivalent phenol component having a bivalent phenol compound and/or an esterificationable derivative thereof as a main component; and phosgene or carbonic acid diester compound.

Examples of the bivalent phenol compound include bis (4-hydroxyphenylmethane), 1,1-bis(4-hydroxyphenyl) ethane, 1,1-bis(4-hydroxyphenyl)propane, 2,2-bis(4-hydroxyphenyl)propane ("bisphenol A"), 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 1,1-bis(4-hydroxyphenyl)cyclopentane, 1,1-bis(4-hydroxyphenyl)cyclohexane, bis(4-hydroxy-3-methylphenyl)methane, bis(4-hydroxy-3-methylphenyl) phenylmethane, 1,1-bis(4-hydroxy-3-methylphenyl)ethane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3-sec-butylphenyl)propane, bis(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl) diphenylmethane, bis(4-hydroxyphenyl)dibenzylmethane, 4,4'-dihydroxydiphenylether, 4,4'-dihydroxydiphenylsulfone, bis(4-hydroxy-3,5-dimethylphenyl)sulfone, 4,4'-dihydroxydiphenylsulfide, 4,4'-dihydroxybenzophenone, phenolphthalein, bis(4-hydroxyphenyl)methane, 1,1-bis(4-hydroxyphenyl)-3,3,5-trimethylcyclohexane ("bisphenol TMC"), bis(4-hydroxypheny)cyclohexylmethane, 2,2-bis(4'-hydroxy-3,5'-dibromophenyl)propane, bis(4-hydroxy-3,5-dichlorophenyl)methane, bis(4-hydroxy-3,5-dimethylphenyl)methane, 2,2-bis(4'-hydroxy-3',5'-dimethylphenyl)propane, and bis(4-hydroxy-3,5-dimethylphenyl)ether. A polymer which is copolymerized with a bivalent phenol having a benzotriazole group may also be used for enhancing the flame resistance. Substituents and derivatives, alkaline metal salts, and alkaline earth metal salts of these bivalent phenol compounds may also be used. A mixture of two or more types of these bivalent phenol compounds may also be used.

Examples of the carbonic acid diester compound include: bisalkylcarbonates such as dimethyl carbonate, diethyl carbonate, di-n-propyl carbonate, diisopropyl carbonate, and di-n-butyl carbonate; and bisarylcarbonates such as diphenyl carbonate, bis(2,4-dichlorophenyl) carbonate, bis(2,4,6-trichlorophenyl) carbonate, bis(2-nitrophenyl) carbonate, bis(2-cyanophenyl) carbonate, bis(4-methylphenyl) carbonate, bis(3-methylphenyl) carbonate, and dinaphtyl carbonate.

For example, the mixing step of mixing the silane-treated foliated phyllosilicate (B) and the monomer as described above can be performed in the following manner. That is, the silane-treated foliated phyllosilicate (B) previously produced and isolated (i.e., the dispersion medium was removed) by the production method of the silane-treated foliated phyllosilicate (B) described above is added to the monomer, and sufficiently agitated to prepare a mixture. Alternatively, if the dispersion medium used in the production of the silane-treated foliated phyllosilicate (B) does not adversely influence the polymerization step, the dispersion medium may not be removed, and the dispersion containing the silane-treated foliated phyllosilicate (B) and the dispersion medium may be directly used to prepare the mixture. In the latter case, the organosilane compound (B2) is introduced into the swellable layered silicate (B1) in the dispersion medium according to the production method of the silane-treated foliated phyllosilicate (B) as described above, to prepare the silane-treated foliated phyllosilicate (B) and thus to obtain the dispersion containing the dispersion medium and the silane-treated foliated phyllosilicate (B). The monomer can then be added to the dispersion and sufficiently agitated to obtain a mixture. The dispersion medium itself may be the monomer as described above.

Next, in the polymerization step, the monomer in the mixture obtained in the mixing step is polymerized by polymerization methods normally performed for various thermoplastic resins (A).

When the thermoplastic resin (A) is a thermoplastic polyester resin, the polymerization step can utilize, for example, a melt polycondensation method described as follows. First, the mixture obtained in the mixing step is put in a polymerization reactor. Another monomer which constitutes the thermoplastic polyester resin may be added as required. The system is heated while agitating and mixing to be put in a melted state. Then, it can be decompressed to be subjected to a melt decondensation reaction. As a catalyst required for the polymerization reaction, one type or two or more types of metal oxides, carbonates, acetates, alcoholates, and the like may be added.

When the diol compound is contained in the mixture, the following method may also be used, in addition to the melt polycondensation method described above. That is, a thermoplastic polyester resin of a desired structure is added to the mixture, and the system is heated to near the melting point of the thermoplastic polyester resin. In this case, a thermoplastic polyester resin having a logarithmic viscosity of 0.3 to 2.0 (dl/g) as measured in a mixed solvent of phenol-tetrachloroethane (weight ratio: 5/5) at 25° C. is preferably used. According to the method, the thermoplastic polyester resin is made a monomer and/or an oligomer having about 2 to 15 repeating units due to the depolymerization reaction of the thermoplastic polyester resin with the diol compound. Then, the system is further sufficiently mixed, so that the silane-treated foliated phyllosilicate is uniformly dispersed in the system. Thereafter, the system is decompressed to be subjected to the melt polycondensation reaction. In this case, although the catalyst required for the reaction has been contained in the staring material resin, one type or two or more types of catalyst(s) similar to that used in the above melt polycondensation may be used additionally, as required.

A solid state polymerization method may also be used, instead of the above melt polycondensation method. For example, the solid state polymerization method is performed in the following manner. That is, a polyester resin of a low degree of polymerization is obtained by the melt polycondensation reaction and solidified by cooling. After sufficient drying, the resin of a low degree of polymerization is heated to a temperature in the range from 150° C. to the melting point of the resin under a flow of an inert gas such as nitrogen or under a decompressed atmosphere. While removing a generating diol compound and the like from the system, the resin of a low degree of polymerization is polymerized in the solid state to obtain a resin of a high degree of polymerization.

When the thermoplastic resin (A) is a polycarbonate resin, the polymerization step can be performed, for example, by utilizing the following interfacial polymerization method. First, methylene chloride and phosgene are added to the mixture containing the alkaline metal salt of the bisphenol compound obtained in the mixing step described above. The mixture is then sufficiently agitated to allow a polycondensation reaction to occur at the interface between the alkaline aqueous phase and the methylene chloride phase. As the catalyst required for the interfacial polymerization method, one type or two or more types of aliphatic tertiary amine, alicyclic tertiary amine, aromatic tertiary amine, and the like may be added.

A melt polymerization method may also be used in place of the interfacial polymerization method described above. An example of the melt polymerization method includes the following. First, a bisphenol compound is added to the mixture containing the carbonic acid diester compound obtained in the mixing step described above. The system is then heated to about 280° C. to about 300° C. while being sufficiently agitated, to allow for an ester exchange reaction in the melted state. As a catalyst required for the melt polymerization method, one type or two or more types of a simple substance, an oxide, a hydroxide, an amide compound, an alcoholate, and a phenolate of an alkali metal or an alkali earth metal, $Sb_2O_3$, ZnO, PbO, an organic titanium compound, a quaternary ammonium salt, and the like may be added.

The thermoplastic resin composition (C) of the present invention can also be produced directly by melt mixing the thermoplastic resin (A) and the silane-treated foliated phyllosilicate (B) using any of various types of melt mixers, in place of the method including the mixing step and the polymerization step as described above.

Examples of the melt mixers include kneaders capable of providing a high shearing force to the system, such as a single screw extruder, a twin screw extruder, a Banbury mixer, and a roll. In particular, an engaging type twin screw extruder having kneading disks is preferable.

Before the melt mixing, normally, the dispersion medium used in the production of the silane-treated foliated phyllosilicate (B) is removed. The removal of the dispersion medium, however, may be omitted if the dispersion medium does not cause an adverse effect such as degrading the thermoplastic resin (A), so that the silane-treated foliated phyllosilicate (B) including the dispersion medium can be used. Such a silane-treated foliated phyllosilicate (B) having the dispersion medium retained therein is preferable since it is effective for uniform dispersion in a resin.

The thermoplastic resin (A) and the silane-treated foliated phyllosilicate (B) may be put in the melt mixer together at the same time for the melt mixing. Alternatively, the silane-treated foliated phyllosilicate (B) may be added to a pre-melted thermoplastic resin (A) for the melt mixing.

The thermoplastic resin composition (C) of the present invention may be produced by the polymerization and the melt mixing as described above. However, when the thermoplastic resin (A) is easily dissolved in a solvent, e.g., when the thermoplastic resin (A) is a polycarbonate resin, a polyarylate resin, a vinyl polymer compound, or a polyphenyleneoxide resin, for example, the thermoplastic resin (A) may be dissolved in a dispersion of the silane-treated foliated phyllosilicate (B) dispersed in a solvent, and then the solvent may be removed by drying or the like.

For example, when the polycarbonate resin described above is used as the thermoplastic resin (A), methylene chloride may be used as the solvent. The silane-treated foliated phyllosilicate (B) is added to the methylene chloride and mixed and dispersed therein by agitating. Then, the polycarbonate resin is added to and dissolved in the dispersion. By removing the methylene chloride by evaporating, the thermoplastic resin composition (C) of the present invention is obtained.

An impact modifier such as polybutadiene, a butadiene-styrene copolymer, acrylic rubber, an ionomer, an ethylene-propylene copolymer, an ethylene-propylenedien copolymer, natural rubber, chlorinated butyl rubber, an α-olefin homopolymer, a copolymer of two or more types of α-olefins (including a random copolymer, a block copolymer, a graft copolymer, and the like and a mixture thereof), and an olefin elastomer may be added to the thermoplastic resin composition (C) of the present invention, as required. An acid compound such as maleic anhydride or an epoxy compound such as glycidyl methacrylate may be copolymerized and/or grafted to the above modifiers. The thermoplastic resin composition (C) may include any arbitrary resin other than the thermoplastic resin (A), such as an unsaturated polyester resin, a polyester carbonate resin, a liquid crystal polyester resin, a polyolefin resin, a polyamide resin, a gummous polymer reinforcing styrene resin, a polyphenylenesulfide resin, polyphenylenether resin, a polyacetal resin, a polysulfone resin, and a polyarylate resin, mixed therein individually or in combination of two or more types, as long as the properties such as the mechanical properties and the moldability of the resultant thermoplastic resin composition (C) are not reduced.

The thermoplastic resin composition (C) of the present invention may further include an additive such as a pigment, a dye, a heat stabilizer, an antioxidant, an ultraviolet absorber, a light stabilizer, a lubricant, a plasticizer, a flame resistant agent, and an antistatic depending on the purpose thereof.

Dispersion State of Silane-Treated Foliated Phyllosilicate (B) in Thermoplastic Composition (C)

The structure of the silane-treated foliated phyllosilicate (B) dispersed in the thermoplastic resin composition (C) of the present invention obtained by the methods as described above is completely different from the aggregate structure like that of the swellable layered silicate (B1) before the mixing, where a number of unit layers are stratified. More specifically, the silane-treated foliated phyllosilicate (B) having an expanded basal spacing compared with that of the aggregate structure of the initial swellable layered silicate (B1) is mixed with the thermoplastic resin (A). By this mixing, the layers of the silane-treated foliated phyllosilicate are further exfoliated between one another, expanding the basal spacing. As a result, the silane-treated foliated phyllosilicate (B) is exfoliated into a number of very fine layers dispersed independently from one another in the thermoplastic resin composition (C). The dispersion state of the silane-treated foliated phyllosilicate (B) in the thermoplastic resin composition (C) can be represented by a variety of parameters as described below.

Assume that a value $[R_{B300}]$ is defined as the rate of the number of unit layers of the silane-treated foliated phyllosilicate (B) having an equivalent area circle diameter [D] of 300 nm or less to the layers of the silane-treated foliated phyllosilicate (B) dispersed in the thermoplastic resin composition (C). The value $[R_{B300}]$ in the thermoplastic resin composition (C) of the present invention is preferably 20% or more, more preferably 35% or more, further more preferably 50% or more. If the value $[R_{B300}]$ is less than 20%, the effect of improving the mechanical properties and the thermal deformation resistance of the thermoplastic resin composition (C) tends to become insufficient.

The equivalent area circle diameter [D] as used herein is intended to be a diameter of a circle having an area equal to the area of each of the unit layers dispersed in various shapes in an image obtained by a microscope or the like. The average value is intended to be a number average of the values of the diameters. The measurement of the equivalent area circle diameter [D] can be quantified by selecting any arbitrary region including 100 or more dispersed layers in an image taken with a microscope or the like, imaging the region using an image processing apparatus, and processing by a computer. Accordingly, an average $[D_B]$ of the equivalent area circle diameters of the silane-treated foliated phyllosilicate (B) can be quantified using a photograph showing the dispersion state of the silane-treated foliated phyllosilicate (B) obtained by taking a photograph of the thermoplastic resin composition (C) of the present invention with a transmission electron microscope (TEM).

In the thermoplastic composition (C) of the present invention, the value $[D_B]$ is preferably 500 nm or less, more preferably 450 nm or less, further more preferably 400 nm or less. When the value $[R_{B300}]$ is within the range described above and the value $[D_B]$ is within the above range, the effect of improving the mechanical properties and the thermal deformation resistance of the thermoplastic resin composition (C) can be further increased. The lower limit of the value $[D_B]$ is not specifically set, but since the effect hardly changes if the value $[D_B]$ is less than about 10 nm, setting the value at less than 10 nm is unnecessary.

The size of the silane-treated foliated phyllosilicate (B) exfoliated can be extremely thin and small compared with the size of the initial swellable layered silicate (B1) having the aggregate structure. That is, assuming that the value $[D_B]$ is defined as an average of the equivalent area circle diameters of the silane-treated foliated phyllosilicate (B) in the thermoplastic resin composition (C) as described above and that a value $[D_{B1}]$ is defined as an average of the equivalent area circle diameters of the swellable layered silicate (B1), the value $[D_B]/[D_{B1}]$ is preferably 0.010 or less, more preferably 0.008 or less, further more preferably 0.005 or less. When the value $[D_B]/[D_{B1}]$ is less than 0.010, the effect of improving the mechanical properties and the thermal deformation resistance of the thermoplastic resin composition (C) further increases. The lower limit is not specifically set, but since the effect does not change if the value $[D_B]/[D_{B1}]$ is less than about 0.0001, setting the value at less than 0.0001 is unnecessary. The value $[D_{B1}]$ of the average equivalent area circle diameter of the initial swellable layered silicate (B1) having the aggregate structure can be obtained in the following manner, for example. That is, a resin composite including the thermoplastic resin (A) and the swellable layered silicate (B1), which has the same ash content as the thermoplastic resin composition (C), is prepared separately using a heat press or the like. A photograph of the resin composite showing the morphology of the swellable layered silicate (B1) therein is taken with an optical microscope. Using this photograph, the value $[D_{B1}]$ can be quantified, as in the quantification of the value $[D_B]$.

The number of layers of the silane-treated foliated phyllosilicate (B) dispersed in the thermoplastic resin composition (C) increases, compared with the number of layers of the initial swellable layered silicate (B1), since the silicate layers are exfoliated to exist independently from one another. More specifically, assuming that a value $[N_B]$ is defined as the number of layers of the silane-treated foliated phyllosilicate (B) per unit ash content and per unit area and that a value $[N_{B1}]$ is defined as the number of layers of the swellable layered silicate (B1) per unit ash content and per unit area, a value $[N_B]/[N_{B1}]$ of the thermoplastic resin composition (C) of the present invention is preferably 300 or more, more preferably 400 or more, further more preferably 500 or more. When the value $[N_B]/[N_{B1}]$ is within the above range, the number of layers of the silane-treated foliated phyllosilicate (B) which serve to enhance the properties of the thermoplastic resin composition (C) increases, thereby further increasing the effect of improving the mechanical properties and the thermal deformation resistance of the thermoplastic resin composition (C). The upper lime is not specifically set, but since the effect does not change if the value $[N_B]/[N_{B1}]$ exceeds about 50000, setting the value exceeding 50000 is unnecessary.

The value [N] which is the number of dispersed layers per unit ash content and per unit area can be obtained in the following manner, for example. First, any arbitrary region including 100 or more dispersed layers is selected on an image taken with a microscope or the like, and the number of dispersed layers present in the region, as well as the area of the region, are obtained. Separately from the above step, the ash content of the thermoplastic resin composition (C) originated from the dispersed layers is measured. The number of dispersed layers is divided by the area of the region and the ash content, to obtain the value [N]. Accordingly, the value $[N_B]$ of the silane-treated foliated phyllosilicate (B) and the value $[N_{B1}]$ of the swellable layered silicate (B1) can be quantified using a photograph of the thermoplastic resin composition (C) taken with a transmission electronic microscope (TEM) or a photograph of the resin composite including the thermoplastic resin (A) and the swellable layered silicate (B1) taken with an optical microscope photograph, as in the measurement of the value [D] of the equivalent area circle diameter. The unit of area is not specifically limited as long as the same unit is used for the calculations of the value $[N_B]$ and the value $[N_{B1}]$. For example, any arbitrary unit such as $\mu m^2$, $nm^2$, and $Å^2$ may be used.

As described above, in the thermoplastic resin composition (C) of the present invention, the silane-treated foliated phyllosilicate (B) is extremely finely dispersed compared with the initial aggregate structure of the swellable layered silicate (B1). If respective dispersed layers of the silane-treated foliated phyllosilicate (B) have a shape of thin plates, the properties such as the mechanical properties and the heat resistance of the thermoplastic resin composition (C) are further efficiently improved. More specifically, the average of the thicknesses of the layers of the silane-treated foliated phyllosilicate (B) in the thermoplastic resin composition (C) should be 20 nm or less, preferably 18 nm or less, more preferably 15 nm or less. The lower limited is not specifically set, but may be about 1 nm.

The measurement of the layer thickness can be quantified by selecting any arbitrary region including 100 or more dispersed layers of the silane-treated foliated phyllosilicate (B), as in the case of the value [D] of the equivalent area circle diameter and the value [N] of the number of dispersed layers described above, and measuring the thicknesses of the respective layers of the silane-treated foliated phyllosilicate (B). The average value is intended to be a number average thereof.

When the rate of the independently dispersed layers of the silane-treated foliated phyllosilicate (B) having a layer thickness of 5 nm or less is 20% or more, preferably 30% or more, with respect to the entire silane-treated foliated phyllosilicate (B), the mechanical properties and the thermal deformation resistance of the thermoplastic resin composition (C) can be more efficiently improved. The method for measuring the layer thickness is similar to that described above.

The crystallinity of the silane-treated foliated phyllosilicate (B) dispersed in the thermoplastic resin composition (C) can be markedly reduced, compared with the crystallinity exhibited by the initial aggregate structure of the swellable layered silicate (B1). More specifically, in the X-ray diffraction measurement performed for the thermoplastic resin composition (C), assuming that a value $[I_B]$ is defined as the diffraction intensity of the small angle X-ray diffraction originated from the silane-treated foliated phyllosilicate (B) and that a value $[I_{B1}]$ is defined as the diffraction intensity of the small angle X-ray diffraction originated from the initial aggregate structure of the swellable layered silicate (B1), a value $[I_B]/[I_{B1}]$ is preferably 0.25 or less, more preferably 0.23 or less, further more preferably 0.20 or less. When the value $[I_B]/[I_{B1}]$ is within the above range, the mechanical properties and the heat resistance of the thermoplastic resin composition (C) can be further improved. The lower limit is not specifically set. If the value $[I_B]$ of the small angle X-ray diffraction intensity originated from the silane-treated foliated phyllosilicate (B) is so small that it becomes difficult to be distinguished from a base line or noise, the value $[I_B]/[I_{B1}]$ is 0, indicating that the silane-treated foliated phyllosilicate (B) has been substantially completely exfoliated and respective layers exist independently from one another. As in the case of the value $[D_{B1}]$, the value $[I_{B1}]$ can be obtained by separately preparing a resin composite including the thermoplastic resin (A) and the swellable layered silicate (B1), which has the same ash content as the thermoplastic resin composition (C), and performing the small angle X-ray diffraction measurement for the resin composite.

The measurement of the small angle X-ray diffraction intensity [I] is performed by measuring the peak intensity or the integrated intensity of the small angle X-ray diffraction. The method for measuring the integrated intensity of the small angle X-ray diffraction is not specifically limited, but methods generally used, for example, include a method where the area is determined from a diffraction diagram obtained by the X-ray diffraction measurement, and a method using a count value. Examples of the method where the area is determined from a diffraction diagram include methods generally used such as a planimeter method, a weight method, and a trigonometric approximation method (peak height×half value width). Examples of the method using a count value include a 2θ sequential scan method, a 2θ step scan method, and a 2θ fixation method.

It is preferable that the basal spacing of the exfoliated silane-treated foliated phyllosilicate (B) in the thermoplastic resin composition (C) is three times or more, preferably five times or more, as large as the basal spacing of the initial swellable layered silicate (B1) having the aggregate structure before the mixing. With such an expanded basal spacing, the mechanical properties and the heat resistance of the thermoplastic resin composition (C) can be improved more efficiently. The basal spacing can be measured in the manner as described above with respect to the preparation method of the silane-treated foliated phyllosilicate (B).

The thermoplastic resin composition (C) of the present invention may be molded by injection molding or heat press molding. It may also be used for blow molding. Also, the thermoplastic resin composition (C) of the present invention can be used for biaxial extension films which can sustain the transparency and are excellent in the mechanical properties. Since molded products and films produced from the thermoplastic resin composition (C) of the present invention are excellent in appearance, mechanical properties, thermal deformation resistance, and the like, they are suitably used for automobile components, components of household electric appliances, components of precision machines, household daily necessities, package/container materials, magnetic recording tap substrates, and other general industrial materials.

EXAMPLES

Hereinbelow, the present invention will be described in more detail by way of examples. The present invention is however not limited to these examples.

Material (Thermoplastic Resin (A))

The following resins were used as obtained, without further purification.

Polyethylene terephthalate (PET) resin:
  PEK2 manufactured by Kanebo, Ltd.
  (logarithmic viscosity ($\eta$inh)=0.63 (dl/g))
  (Hereinbelow, referred to as PET.)
Polybutylene terephthalate (PBT) resin:
  PBT120 manufactured by Kanebo, Ltd.
  (logarithmic viscosity ($\eta$inh)=0.82 (dl/g))
  (Hereinbelow, referred to as PBT.)
Polycarbonate (PC) resin:
  Taflon A-2200 manufactured by Idemitsu Petrochemical Co., Ltd.
  (weight average molecular weight (Mw)=45000)
  (Hereinbelow, referred to as PC.)
(Monomer for Thermoplastic Resin (A))

The following compounds were used as obtained, without further purification.

Bishydroxyethyl terephthalate:
  NISSO BHET manufactured by Nisso Maruzen Chemical Co., Ltd.
  (Hereinbelow, referred to as BHET.)
Dimethyl terephthalate:
  a best quality reagent manufactured by Wako Pure Chemical Industries, Ltd.
  (Hereinbelow, referred to as DMT.)
Ethylene glycol:
  monoethylene glycol manufactured by Nippon Shokubai Kagaku Kogyo Co., Ltd.
  (Hereinbelow, referred to as EG.)
1,4-butanediol:
  1,4-butanediol manufactured by Toso Co., Ltd.
  (Hereinbelow, referred to as 1,4-BD.)
(Swellable Layered Silicate (B1))

As the montmorillonite, natural montmorillonite mined in Yamagata Prefecture, Japan (basal spacing=1.3 nm) was used.

As the swellable mica, one synthesized in the following manner was used.

Synthesis of swellable mica: Finely pulverized powders of 25.4 g of talc and 4.7 g of sodium silicofluoride were mixed and heated to 800° C., to obtain 28.2 g of swellable mica (basal spacing=1.2 nm).

(Organosilane Compound (B2))

The following compounds were used as obtained, without further purification.

$\gamma$-(2-aminoethyl)aminopropyltrimethoxysilane
  $\gamma$-glycidoxypropyltrimethoxysilane
  $\gamma$-(polyoxyethylene)propyltrimethoxysilane Measurement Method (FT-IR)

The silane-treated foliated phyllosilicate was added to tetrahydrofuran (THF) and agitated for 15 minutes, to wash off an adsorbing organosilane compound, and then centrifuged to separate the supernatant. This cleaning operation was repeated three times. About 1 mg of the silane-treated foliated phyllosilicate sufficiently dried and about 200 mg of KBr powder were sufficiently mixed with a mortar. A KBr disk for measurement was produced from the resultant mixture using a desk press. The measurement was then performed by a transmission method using an infrared spectroscope. An MCT detector was used as a detector with a resolving power of 4 cm$^{-1}$ and scans of 100 times.

(Transmission Electron Microscope (TEM))

A thin section having a thickness of 80 to 100 nm was cut off from the sample using a microtome. The sample was measured using a transmission electron microscope (JEM-1200EX manufactured by JEOL, Ltd.) under an acceleration voltage of 80 kV.

The average of the layer thicknesses was calculated by measuring the thicknesses of respective layers of the silane-treated foliated phyllosilicate in an arbitrary region of a TEM photograph of the thermoplastic resin composition of the present invention where 100 or more layers of the silane-treated foliated phyllosilicate are present and calculating a number average of the thicknesses.

The value [N] of the number of layers per unit ash content and per unit area and the value [D] of the average of the equivalent area circle diameters were calculated by selecting an arbitrary region of the TEM photograph where 100 or more layers of the silane-treated foliated phyllosilicate are present and performing a processing using an image analyzer, PIAS III manufactured by Interquest Co.

An optical microscope was optionally used in the observation of the morphology of the swellable layered silicate in the system produced in each of the comparative examples and production examples.

(Small Angle X-Ray Diffraction (SAXS))

The sample was measured with an X-ray generator (RU-200B manufactured by Rigaku Denki Co., Ltd.) using a target CuK$\alpha$ ray and an Ni filter under the conditions of a voltage of 40 kV, a current of 200 mA, a scanning angle 2$\theta$ of 0.2 to 16.0°, and a step angle of 0.02°.

The intensity [I] of the small angle X-ray diffraction was measured from the area of a diffraction diagram. When the diffraction diagram is difficult to be distinguished from a base line, that is, when the diffraction peak is very small, the rate of the X-ray diffraction intensity was set at 0%.

The basal spacing was calculated by calculated by calculating the Bragg equation using the actual peak angle value of the small angle X-ray diffraction. When the confirmation of the peak angle value of the small angle X-ray diffraction is difficult, it was considered that the layers had been sufficiently exfoliated to substantially lose the crystallinity as described above, or that the confirmation was difficult since the peak angle value was about 0.8° or less, giving the evaluation result of the basal spacing of >10 nm.

(Ash Content)

The ash content of the thermoplastic resin composition originated from the silane-treated foliated phyllosilicate was measured in compliance with JIS K7052.

Since the ash content of the thermoplastic resin used in examples, comparative examples, and reference examples are substantially 0, the measured ash content is concluded to be the ash content originated from the silane-treated foliated phyllosilicate.

(Preparation of Test Piece)

After being dried, the thermoplastic resin composition was injection-molded using an injection molding machine with a mold clamping pressure of 75 t at a resin temperature of about 260 to 280° C., to prepare a test piece having a dimension of about 10×100×6 mm.

(Load Deflection Temperature)

The load deflection temperature of the test piece obtained by the injection molding when it is under a load of 1.85 MPa was measured in compliance with ASTM D-648.

(Flexural Properties)

The flexural strength and the flexural elastic modulus of the test piece obtained by the injection molding were measured in compliance with ASTM D-790.

(Surface Appearance of Molded Product)

The gloss and color tone of the test piece obtained by the injection molding were visually observed. The evaluation results were represented by O, Δ, and x as follows:

O: Glossy and no dots in color tone

Δ: The transparency is lost or the color tone is non-uniform.

x: The transparency is lost and the color tone is non-uniform.

(Measurement of Logarithmic Viscosity)

After a polyester resin composition was dried at 140° C. for four hours, about 100 mg thereof was accurately weighed. Then, the polyester resin composition was added to and dissolved in 20 ml of a mixed solvent of phenol/1,1,2,2-tetrachloroethane (weight ratio: 5/5) at 120° C. The viscosity of the solution was measured with an automatic viscosity measuring apparatus (Viscotimer manufactured by Rauda Co.) using a Ubbelohde viscometer, and the logarithmic viscosity (ηinh) was calculated from the equation below. The measurement temperature was 25° C.

$$\eta inh=\{1n(t/t_0)\}/C \qquad (I)$$

wherein t denotes the measured value of the solution, $t_0$ denotes the measured value of the mixed solvent, and C denotes the concentration (g/dl).

Production Example 1

Montmorillonite, 150 g, was dispersed in 6800 g of pure water by agitating at 5000 rpm for three minutes using a high-seed agitator. Thereafter, 15 g of γ-(2-aminoethyl)aminopropyltrimethoxysilane was dropped in using a pipette, and the resultant mixture was agitated at a revolution of 6000 rpm for two hours, to obtain a slurry (slurry a) composed of a silane-treated foliated phyllosilicate and water.

A portion of the slurry was dried and pulverized to obtain a silane-treated foliated phyllosilicate (silane-treated foliated phyllosilicate a). The resultant silane-treated foliated phyllosilicate had a basal spacing of 2.6 nm. The silane-treated foliated phyllosilicate was washed with THF and then measured by FT-IR. As a result, absorption bands originating from a primary amino group, a secondary amino group, and an ethylene group were observed.

The silane-treated foliated phyllosilicate and the slurry obtained in Production Example 1 are referred to as "silane-treated foliated phyllosilicate a" and "slurry a", respectively.

Production Example 2

Montmorillonite, 150 g, was dispersed in 4500 g of pure water by agitating at 5000 rpm for three minutes using a high-speed agitator. Thereafter, 15 g of γ-glycidoxypropyltrimethoxysilane hydrolyzed with a mixed solvent of ethanol/water (weight ratio: 9/1) adjusted to a pH of 5.0 was dropped in using a simplified pipette. The resultant mixture was agitated at a shear rate of 20000 (1/s) for three hours, to obtain a slurry (slurry b) composed of a silane-treated foliated phyllosilicate and water.

A portion of the slurry as dried and pulverized to obtain a silane-treated foliated phyllosilicate (silane-treated foliated phyllosilicate b). The resultant silane-treated foliated phyllosilicate had a basal spacing of 2.0 nm. The silane-treated foliated phyllosilicate was washed with THF and then measured by FT-IR. As a result, absorption bands originating from an epoxy ring (ethyleneoxide group), an ether group, and a methylene group were observed.

The silane-treated foliated phyllosilicate and the slurry obtained in Production Example 2 are referred to as "silane-treated foliated phyllosilicate b" and "slurry b", respectively.

Production Example 3

Montmorillonite, 150 g, was dispersed in 4500 g of pure water by agitating at 5000 rpm for three minutes using a high-speed agitator. Thereafter, 15 g of γ-polyoxyethylenepropyltrimethoxysilane hydrolyzed with water adjusted to a pH of 4 with hydrochloric acid was dropped in using a simplified pipette. The resultant mixture was agitated at a shear rate of 20000 (1/s) for two hours, to obtain a slurry (slurry c) composed of a silane-treated foliated phyllosilicate and water.

A portion of the slurry was dried and pulverized to obtain a silane-treated foliated phyllosilicate (silane-treated foliated phyllosilicate c). The resultant silane-treated foliated phyllosilicate had a basal spacing of 2.4 nm. The silane-treated foliated phyllosilicate was washed with THF and then measured by FT-IR. As a result, absorption bands originating from an ether group and an ethylene group were observed.

The silane-treated foliated phyllosilicate and the slurry obtained in Production Example 3 are referred to as "silane-treated foliated phyllosilicate c" and "slurry c", respectively.

Production Example 4

Swellable mica, 150 g, was dispersed in 3500 g of pure water by agitating at 6000 rpm for six minutes using a high-speed agitator. Thereafter, 25 g of γ-(2-aminoethyl)aminopropyltrimethoxysilane was dropped in using a simplified pipette. The resultant mixture was agitated at a shear rate of 30000 (1/s) for three hours, to obtain a slurry (slurry d) composed of a silane-treated foliated phyllosilicate and water.

A portion of the slurry was dried and pulverized to obtain a silane-treated foliated phyllosilicate (silane-treated foliated phyllosilicate d). The resultant silane-treated foliated phyllosilicate had a basal spacing of 1.8 nm. The silane-treated foliated phyllosilicate was washed with THF and then measured by FT-IR. As a result, absorption bands originating from a primary amino group, a secondary amino group, and a methylene group were observed.

The silane-treated foliated phyllosilicate and the slurry obtained in Production Example 4 are referred to as "silane-treated foliated phyllosilicate d" and "slurry d", respectively.

Production Example 5

Montmorillonite, 150 g, was sprayed with 15 g of γ-(2-aminoethyl)aminopropyltrimethoxysilane using a spray and left for one hour to mix therewith, so as to obtain treated montmorillonite. The treated montmorillonite had a basal spacing of 1.3 nm which was the same as the basal spacing of the untreated initial montmorillonite. The treated montmorillonite was washed with THF and then measured by FT-IR. As a result, absorption bands originating from a primary amino group, a secondary amino group, and an ethylene group were observed.

The treated montmorillonite obtained in Production Example 5 is referred to as "treated montmorillonite a'".

Production Examples 6 to 16

Powdered thermoplastic resin, 100 g, and swellable layered silicate of amounts shown in Table 1 below were blended in the dry state. Using 15 g of each of the resultant mixtures, a molded product with a dimension of about 10×100×3 mm composed of the thermoplastic resin and the swellable layered silicate was produced using a heat press under the molding conditions (temperature and pressure) shown in Table 1.

TABLE 1

| | | | Production Examples | | | | | | | | | | |
|---|---|---|---|---|---|---|---|---|---|---|---|---|---|
| | | | 6 | 7 | 8 | 9 | 10 | 11 | 12 | 13 | 14 | 15 | 16 |
| Thermoplastic resin | | | PET | | | | | | PBT | | | PC | |
| Swellable layered silicate | Montmorillonite | Mixing amount g | 3.6 | 6.2 | 15.0 | 32.0 | 115 | | 3.6 | 6.2 | 15.0 | 6.0 | |
| | | (parts by wt.) | 3.6 | 6.2 | 15.0 | 32.0 | 115 | | 3.6 | 6.2 | 15.0 | 6.0 | |
| | Swellable mica | Mixing amount g | | | | | | 6.2 | | | | 6.0 | |
| | | (parts by wt.) | | | | | | 6.2 | | | | 6.0 | |
| Molding condition | Temperature (° C.) | | 270 | | | | | | 240 | | | 280 | |
| | Pressure (kg/cm²) | | 800 | | | | | | 800 | | | 800 | |
| Ash content (wt. %) | | | 3.4 | 5.8 | 13.2 | 24.3 | 53.0 | 6.0 | 3.4 | 5.9 | 13.2 | 5.7 | 5.8 |

Example 1

Slurry a, 400 g, produced in Production Example 1 and 3000 g of bishydroxyethyl terephthalate (hereinbelow, referred to as BHET) were put in an autoclave provided with a distilling tube and mixed, and agitated at a temperature of about 120° C. for about three hours. While being further agitated for about one hour, the mixture was decompressed to remove water, so as to prepare a BHET slurry (containing a minute amount of water) essentially composed of silane-treated foliated phyllosilicate a and BHET.

Thereafter, 7.5 g of a hindered phenol stabilizer (AO60 manufactured by Asahi Denka Kogyo K.K.; hereinbelow, referred to as AO60) and 0.45 of antimony trioxide ($Sb_2O_3$; hereinbelow, referred to as $Sb_2O_3$) as polymerization catalyst were added to the slurry, to polymerize BHET at a polymerization reaction temperature of 280° C. under decompression, thereby to produce polyethylene terephthalate (PET). Thus, a thermoplastic polyester resin composition containing silane-treated foliated phyllosilicate a was produced. The logarithmic viscosity of the PET in the thermoplastic polyester resin composition was 0.59 (dl/g).

TEM observation was performed for a test piece obtained by the injection molding of the resultant thermoplastic polyester resin composition, to obtain, with respect to the dispersed silane-treated foliated phyllosilicate, the value $[R_{B300}]$ of the rate of dispersed layers having an equivalent area circle diameter of 300 nm or less with respect to the entire silane-treated foliated phyllosilicate, the value $[D_B]$ of the average of the equivalent area circle diameters, the value $[N_B]$ of the number of layers of the silane-treated foliated phyllosilicate per unit ash content and per unit area, the average value of the layer thicknesses, and the rate of layers having a thickness of 5 nm or less with respect to the entire dispersed layers. FIG. 1 shows a TEM photograph of the thermoplastic polyester resin composition obtained in Example 1. As is apparent from FIG. 1, the layers of the silane-treated foliated phyllosilicate are dispersed in the resin phase in the state of very thin layers without aggregating with one another.

Figure 2:
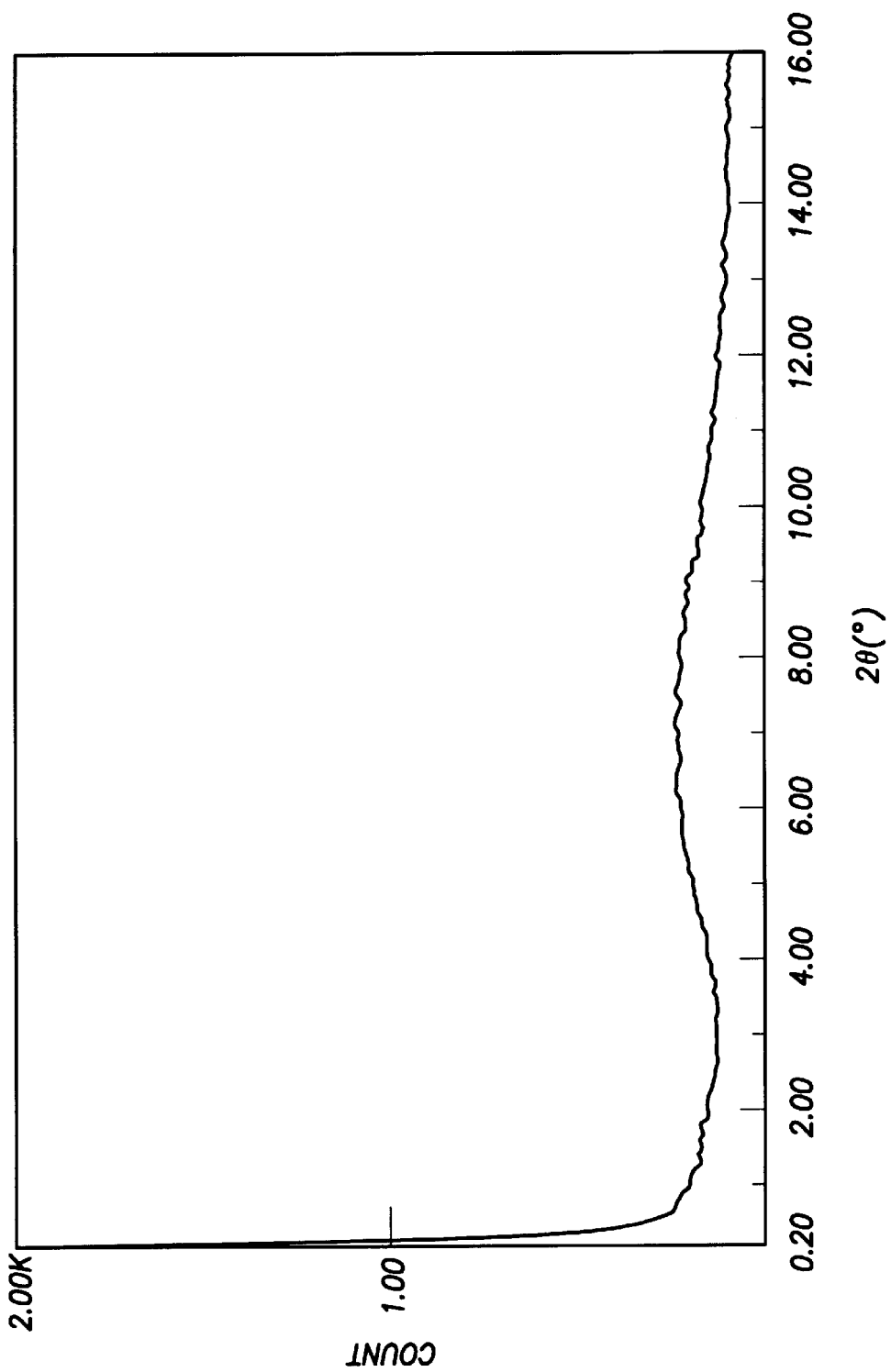
FIG. 2 is a diagram of a small angle X-ray diffraction originated from the silane-treated foliated phyllosilicate (B) of a thermoplastic polyester resin composition (C) obtained in Example 1.

The SAXS measurement was performed for the injection-molded test piece of the thermoplastic polyester resin composition, to obtain the value $[I_B]$ of the intensity of the small angle X-ray diffraction originating from silane-treated foliated phyllosilicate a and the basal spacing of silane-treated foliated phyllosilicate a. A small angle X-ray diffraction diagram of the thermoplastic polyester resin composition obtained in Example 1 is shown in FIG. 2. As is shown in FIG. 2, no peak of crystallinity originating from the silane-treated foliated phyllosilicate was observed. This indicates that the layers were not aggregated with one another but were dispersed independently. The evaluation result of the basal spacing in this case was set as >10 nm.

The optical microscope observation and the SAXS measurement were performed for the molded product obtained in Production Example 6. The results were evaluated in the manner described above, and the value $[D_B]/[D_{B1}]$, the value $[N_B]/[N_{B1}]$, and the value $[I_B]/[I_{B1}]$ were obtained.

Other evaluation items include the ash content of the thermoplastic polyester resin composition originating from the silane-treated foliated phyllosilicate, and the load deflection temperature, the flexural strength, the flexural elastic modulus, and the visual surface finishing of the injection-molded test piece.

The above evaluation results are shown in Table 2 below.

Example 2

PET was produced by polymerization in the manner described in Example 1, except that 2700 g of slurry b produced in Production Example 2 was used, to produce a thermoplastic polyester resin composition containing silane-treated foliated phyllosilicate b, and the resultant composition was evaluated. The evaluation results are shown in Table 2 below.

The logarithmic viscosity of PET in the thermoplastic polyester resin composition produced in Example 2 was 0.60 (dl/g).

Example 3

PET was produced by polymerization in the manner described in Example 1, except that 2700 g of slurry c produced in Production Example 3 was used, to produce a thermoplastic polyester resin composition containing silane-treated foliated phyllosilicate c, and the resultant composition was evaluated. The evaluation results are shown in Table 2 below.

The logarithmic viscosity of PET in the thermoplastic polyester resin composition produced in Example 3 was 0.60 (dl/g).

Example 4

Slurry a produced in Production Example 1, 400 g, and 3000 g of 1,4-BD were put in an autoclave provided with a distilling tube and sufficiently mixed. Thereafter, the mixture was agitated at a temperature of about 120° C. for about three hours. While being further agitated for about one hour, the mixture was decompressed to remove water, so as to prepare a 1,4-BD slurry (containing a minute amount of water) essentially composed of silane-treated foliated phyllosilicate a and 1,4-BD.

Thereafter, 1765 g of DMT, 6.0 g of AD60, and 0.42 g of titanium tetrabutoxide (Ti(OBu)$_4$) as an ester exchange catalyst were put in the autoclave. A rectifying column was attached to the autoclave, and the mixture was agitated at a reaction temperature of about 190° C. for about four hours, to allow DMT and 1,4-BD to perform ester exchange with each other to produce bishydroxybutyl terephthalate (hereinbelow, referred to as BHBT).

Thereafter, the rectifying column was removed, BHBT was then polymerized under decompression to produce polybutylene terephthalate (PBT) at 260° C. of polymerization temperature, and thus to produce a thermoplastic polyester resin composition containing silane-treated foliated phyllosilicate a. The resultant composition was evaluated in the manner described in Example 1, except that the system produced in Production Example 12 was used in place of the system produced in Production Example 6. The results are shown in Table 2 below.

The logarithmic viscosity of PBT in the thermoplastic polyester resin composition produced in Example 4 was 0.82 (dl/g).

Example 5

Slurry a produced in Production Example 1, 14000 g, and 5000 g of EG were mixed and agitated at a temperature of about 130° C. for about four hours. While being further agitated for about one and a half hours, the mixture was decompressed to remove water, so as to prepare an EG slurry (containing a minute amount of water) essentially composed of silane-treated foliated phyllosilicate a and EG.

Thereafter, the EG slurry, 5000 g of PET, and 15 g of a hindered phenol stabilizer were put in a horizontal continuous polymerization reactor via a supply port thereof, and agitated at 30 rpm at a temperature of 280° C. for about three hours, so as to depolymerize PET while removing ethylene glycol from the system. Then, the system was decompressed and generated ethylene glycol was removed from the system, to allow for polycondensation reaction to obtain PET. Thus, a thermoplastic polyester resin composition containing silane-treated foliated phyllosilicate a was produced and continuously released from a spout of the reactor. The resultant composition was evaluated in the manner described in Example 1, except that the system produced in Production Example 7 was used in place of the system produced in Production Example 6. The results are shown in Table 2 below.

The logarithmic viscosity of PET in the thermoplastic polyester resin composition produced in Example 5 was 0.64 (dl/g).

Example 6

PBT was polymerized in the manner described in Example 5, except that 1,4-BD was used in place of EG, PBT was used in place of PET, and the temperature of the polymerization reactor was set at 260° C., to produce a thermoplastic polyester resin composition containing silane-treated foliated phyllosilicate a. The resultant composition was evaluated in the manner described in Example 1, except that the system produced in Production Example 13 was used in place of the system produced in Production Example 6. The results are shown in Table 2 below.

The logarithmic viscosity of PBT in the thermoplastic polyester resin composition produced in Example 6 was 0.83 (dl/g).

Example 7

PET was polymerized in the manner described in Example 5, except that 7000 g of slurry d produced in Production Example 4 was used in place of slurry a, to produce a thermoplastic polyester resin composition containing silane-treated foliated phyllosilicate d. The resultant composition was evaluated in the manner described in Example 1, except that the system produced in Production Example 11 was used in place of the system produced in Production Example 6. The results are shown in Table 2 below.

The logarithmic viscosity of PET in the thermoplastic polyester resin composition produced in Example 7 was 0.65 (dl/g).

Example 8

Using 10000 g of slurry a and 1950 g of BHET, a BHET slurry (containing a minute amount of water) essentially composed of silane-treated foliated phyllosilicate a and BHET was prepared, as described in Example 1.

Thereafter, 4.5 g of AO60 and 0.2 g of $Sb_2O_3$ were added to effect polymerization as described in Example 1, to obtain a composition essentially composed of silane-treated foliated phyllosilicate a and PET having a low molecular weight and a logarithmic viscosity of 0.27 (dl/g).

The composition was solidified by cooling and sufficiently dried. The resultant composition was subjected to solid-phase polymerization under a decompression of about 0.5 torr at 200 to 210° C. for nine hours, to increase the molecular weight of the PET and thus to produce a thermoplastic polyester resin composition containing silane-treated foliated phyllosilicate a. The resultant composition was evaluated in the manner described in Example 1, except that the system produced in Production Example 8 was used in place of the system produced in Production Example 6. The results are shown in Table 2 below.

The logarithmic viscosity of PET in the thermoplastic polyester resin composition produced in Example 8 was 0.61 (dl/g).

Example 9

A thermoplastic polyester resin composition containing silane-treated foliated phyllosilicate b was produced in the manner described in Example 8, except that 6750 g of slurry b was used in place of slurry a. The resultant composition was evaluated in the manner described in Example 1 except that the system produced in Production Example 8 was used in place of the system produced in Production Example 6. The results are shown in Table 2 below.

The logarithmic viscosity of PET in the thermoplastic polyester resin composition produced in Example 9 was 0.62 (dl/g).

Example 10

PBT was polymerized using 10000 g of slurry a, 2250 g of 1,4-BD, 1330 g of DMT, 0.32 g of Ti(OBu)$_4$, and 4.5 of AO60 in a manner as described in Example 4, to obtain a composition essentially composed of silane-treated foliated phyllosilicate a and the PBT having a low molecular weight and a logarithmic viscosity of 0.29 (dl/g).

The composition was subjected to solid-phase polymerization as described in Example 8, to increase the molecular weight of the PBT and thus to produce a thermoplastic polyester resin composition. The resultant composition was evaluated in the manner described in Example 1, except that the system produced in Production Example 14 was used in place of the system produced in Production Example 6. The results are shown in Table 2 below.

The logarithmic viscosity of PBT in the thermoplastic polyester resin composition produced in Example 10 was 0.79 (dl/g).

Example 11

Slurry a was dried and pulverized to obtain powdered silane-treated foliated phyllosilicate a.

Then, 480 g of silane-treated foliated phyllosilicate a, 1500 g of PET, of AO60 were dry-blended. The mixture was molten and mixed using a unidirectional engaging type twin screw extruder provided with a kneading disk at 100 rpm at a set temperature of 250 to 270° C., so as to produce a thermoplastic polyester resin composition containing silane-treated foliated phyllosilicate a. The resultant composition was evaluated in the manner described in Example 1 except that the system produced in Production Example 9 was used in place of the system produced in Production Example 6. The results are shown in Table 2 below.

Reference Examples 1 and 2

PET and PBT test pieces were obtained by injection molding, and the load deflection temperature, the flexural elastic modulus, and the surface finishing were evaluated. The results are shown in Table 2 below.

TABLE 2

| | Examples | | | | | | | | | | | Reference Examples | |
|---|---|---|---|---|---|---|---|---|---|---|---|---|---|
| | 1 | 2 | 3 | 4 | 5 | 6 | 7 | 8 | 9 | 10 | 11 | 1 | 2 |
| Thermoplastic resin | PET | PET | PET | PBT | PET | PBT | PET | PET | PET | PBT | PET | PET | PBT |
| Silane-treated foliated phyllo-silicate Type | a | b | c | a | a | a | d | a | b | a | a | — | — |
| (parts by weight) | 3.6 | 3.6 | 3.6 | 3.6 | 6.2 | 6.2 | 6.2 | 15.0 | 15.0 | 15.0 | 32.0 | 0 | 0 |
| Ash content (wt. %) | 3.4 | 3.4 | 3.5 | 3.5 | 5.8 | 5.9 | 6.0 | 13.1 | 13.0 | 13.1 | 24.1 | 0 | 0 |
| [R$_{8300}$] (%) | 95 | 83 | 89 | 92 | 99 | 99 | 63 | 88 | 73 | 84 | 59 | | |
| [D$_8$] (nm) | 105 | 154 | 123 | 108 | 71 | 75 | 389 | 145 | 193 | 151 | 258 | | |
| [D$_8$/D$_{81}$] × 10$^{-3}$ | 2.63 | 3.85 | 3.08 | 2.70 | 1.78 | 1.88 | 8.77 | 3.63 | 4.83 | 3.78 | 6.45 | | |
| [N$_8$](pcs./wt % · μm$^1$) | 4.14 | 2.78 | 3.64 | 4.09 | 6.66 | 6.54 | 1.95 | 3.89 | 2.45 | 3.79 | 2.13 | | |
| [N$_8$/N$_{81}$] value | 1463 | 982 | 1286 | 1445 | 2354 | 2311 | 689 | 1375 | 851 | 1340 | 723 | | |
| Average layer thickness (nm) | 2.5 | 5.1 | 4.1 | 3.1 | 1.7 | 1.8 | 8.8 | 5.6 | 10.7 | 6.9 | 11.5 | | |
| Ratio of 5 nm or less thick layers | 85 | 68 | 74 | 80 | 91 | 90 | 47 | 79 | 61 | 75 | 61 | | |
| [I$_8$/I$_{81}$] × 10$^{-2}$ | 0 | 0 | 0 | 0 | 0 | 0 | 10.1 | 0 | 5.2 | 0 | 12.9 | | |
| Basal spacing (nm) | >10 | >10 | >10 | >10 | >10 | >10 | 8.0 | >10 | 9.1 | >10 | 6.9 | | |
| Load deflection temperature (° C.) | 139 | 130 | 134 | 120 | 169 | 150 | 156 | 189 | 177 | 170 | 197 | 85 | 60 |
| Flexural strength (MPa) | 135 | 128 | 130 | 120 | 160 | 141 | 150 | 175 | 172 | 159 | 180 | 109 | 105 |
| Flexural elastic modulus (MPa) | 5690 | 5320 | 5480 | 4990 | 6640 | 5890 | 6020 | 7750 | 7260 | 6910 | 8200 | 2970 | 2610 |
| Surface finishing | ○ | ○ | ○ | ○ | ○ | ○ | ○ | ○ | ○ | ○ | Δ | ○ | ○ |

Comparative Example 1

A polyester resin composition was produced in the manner described in Example 11, except that 1150 g of silane-treated foliated phyllosilicate a, 1000 g of PET, and 3.0 g of AO60 were used. The resultant composition was evaluated in the manner described in Example 1, except that the system produced in Production Example 10 was used in place of the system produced in Production Example 6. The results are shown in Table 3 below.

Comparative Example 2

PET was polymerized in the manner described in Example 1, except that 90 g of montmorillonite was used in place of slurry a, to produce a composite composed of PET and montmorillonite, and the resultant composite was evaluated. The results are shown in Table 3 below.

The logarithmic viscosity of PET in the composite produced in Comparative Example 2 was 0.62 (dl/g).

Comparative Example 3

A composite composed of PET and montmorillonite was produced in the manner described in Example 11, except that 640 g of montmorillonite, 2000 g of PET, and 6.0 g of AO60 were used. The resultant composite was evaluated in the manner described in Example 1 except that the system produced in Production Example 9 was used in place of the system produced in Production Example 6. The results are shown in Table 3 below.

Comparative Example 4

PET was polymerized in the manner described in Example 1, except that 155 g of treated montmorillonite a' was used in place of slurry a, to produce a composite composed of the PET and the treated montmorillonite a'. The resultant composition was evaluated in the manner described in Example 1, except that the system produced in Production Example 7 was used in place of the system produced in Production Example 6. The results are shown in Table 3 below.

The logarithmic viscosity of PET in the composite produced in Comparative Example 4 was 0.63 (dl/g).

Comparative Example 5

PBT was polymerized in the manner described in Example 4, except that 124 g of treated montmorillonite a' was used in place of slurry a, to produce a composite composed of the PBT and the treated montmorillonite a'. The resultant composition was evaluated in the manner described in Example 1, except that the system produced in Production Example 13 was used in place of the system produced in Production Example 6. The results are shown in Table 3 below.

The logarithmic viscosity of PBT in the composite produced in Comparative Example 5 was 0.83 (dl/g).

Examples 13 and 14

Slurry b and slurry d were dried and pulverized to obtain powdered silane-treated foliated phyllosilicate b and silane-treated foliated phyllosilicate d, respectively.

A Polycarbonate resin composition containing silane-treated foliated phyllosilicate b or silane-treated foliated phyllosilicate d was produced in the manner described in Example 12, except that silane-treated foliated phyllosilicate b or silane-treated foliated phyllosilicate d was used in place of silane-treated foliated phyllosilicate a. The resultant composition was evaluated in the manner described in Example 1, except that the system produced in Production Example 15 or 16 was used in place of the system produced in Production Example 6. The results are shown in Table 4 below.

Example 15

Slurry c was dried and pulverized to obtain powdered silane-treated foliated phyllosilicate c.

Then, 95 g of silane-treated foliated phyllosilicate c was added to 3000 g of methylene chloride, and agitated using a high-speed agitator at 6000 rpm for 30 minutes, to obtain a

TABLE 3

| | Comparative Examples | | | | |
|---|---|---|---|---|---|
| | 1 | 2 | 3 | 4 | 5 |
| Thermoplastic resin | PET | PET | PET | PET | PBT |
| Inorganic compound type | Silane-treated foliated phyllosilicate a | Mont-morillonite | Mont-morillonite | Treated montmorillonite a' | Treated montmorillonite a' |
| (parts by weight) | 115 | 3.6 | 32.0 | 6.2 | 6.2 |
| Ash content (wt. %) | 52.5 | 3.5 | 24.1 | 5.8 | 5.8 |
| $[R_{8300}]$ (%) | 13 | 0 | 0 | 0 | 0 |
| $[D_8]$ (nm) | 926 | 1950 | 3080 | 1870 | 1820 |
| $[D_8/D_{81}] \times 10^{-3}$ | 23.2 | 48.8 | 77.0 | 46.8 | 45.5 |
| $[N_8]$ (pcs./wt % · $\mu m^2$) | 0.750 | 0.051 | 0.016 | 0.058 | 0.054 |
| $[N_8/N_{81}]$ value | 265 | 18.0 | 5.7 | 20.5 | 19.1 |
| Average layer thickness (nm) | 56.1 | 3330 | 4590 | 3160 | 3020 |
| Ratio of 5 nm or less thick layers | 21 | 0 | 0 | 0 | 0 |
| $[I_8/I_{81}] \times 10^{-2}$ | 76.1 | 92.6 | 95.0 | 92.0 | 91.0 |
| Basal spacing (nm) | 3.6 | 1.3 | 1.3 | 1.3 | 1.3 |
| Load deflection temperature (° C.) | 131 | 87 | 118 | 89 | 62 |
| Flexural strength (MPa) | 32 | 110 | 87 | 109 | 106 |
| Flexural elastic modulus (MPa) | 5420 | 3010 | 4530 | 3180 | 2730 |
| Surface finishing | x | ○ | x | Δ | Δ |

Example 12

Slurry a was dried and pulverized to obtain powdered silane-treated foliated phyllosilicate a.

Then, 120 g of silane-treated foliated phyllosilicate a, 2000 g of PC, and 6.0 g of a phosphorus-containing stabilizer (Adequastave PEP36 manufactured by Asahi Denka Co.; hereinafter, referred to as a PEP36) were dry-blended. The mixture was molten and mixed using a unidirectional engaging type twin screw extruder provided with a kneading disk at 100 rpm at a set temperature of 260 to 280° C., so as to produce a polycarbonate resin composition containing silane-treated foliated phyllosilicate a. The resultant composition was evaluated in the manner described in Example 1, except that the system produced in Production Example 15 was used in place of the system produced in Production Example 6. The results are shown in Table 4 below.

methylene chloride dispersion containing silane-treated foliated phyllosilicate c. Thereafter, 760 g of PC was added to the methylene chloride dispersion and agitated at 300 rpm for 40 minutes to allow the PC to dissolve therein, so as to produce a methylene chloride solution containing silane-treated foliated phyllosilicate c and PC.

The methylene chloride solution was continuously put in a horizontal continuous dryer provided with an agitator and an air duct, of which inner temperature was set at 50 to 80° C., to dry the solution removing methylene chloride. The resultant solution was further dried at 120° C. to produce a polycarbonate resin composition containing silane-treated foliated phyllosilicate c. The resultant composition was evaluated in the manner described in Example 1, except that the system produced in Production Example 15 was used in place of the system produced in Production Example 6. The results are shown in Table 4 below.

Reference Example 3

A PC test piece was obtained by molding, and the load deflection temperature, the flexural elastic modulus, and the surface finishing were evaluated. The results are shown in Table 4 below.

Comparative Examples 6 and 7

A composite essentially composed of PC and montmorillonite or treated montmorillonite a' was produced in the manner described in Example 12, except that montmorillonite or treated montmorillonite a' were used in place of the silane-treated foliated phyllosilicate. The resultant composition was evaluated in the manner described in Example 1, except that the system produced in Production Example 15 was used in place of the system produced in Production Example 6. The results are shown in Table 4 below.

TABLE 4

| | Examples | | | | Ref. Example | Comparative Examples | |
|---|---|---|---|---|---|---|---|
| | 12 | 13 | 14 | 15 | 3 | 6 | 7 |
| Thermoplastic resin | PC | PC | PC | PC | PC | PC | PC |
| Inorganic compound Type | Silane-treated foliated phyllosilicate a | Silane-treated foliated phyllosilicate b | Silane-treated foliated phyllosilicate c | Silane-treated foliated phyllosilicate d | — | Montmorillonite | Treated montmorillonite a' |
| (parts by weight) | 6.0 | 6.0 | 6.0 | 6.0 | 0 | 6.0 | 6.0 |
| Ash content (wt. %) | 5.8 | 5.8 | 5.8 | 5.9 | 0 | 5.8 | 5.7 |
| $[R_{8330}]$ (%) | 71 | 67 | 53 | 91 | | 0 | 0 |
| $[D_8]$ (nm) | 218 | 296 | 512 | 91 | | 3050 | 2950 |
| $[D_8/D_{81}] \times 10^{-3}$ | 5.45 | 7.40 | 8.53 | 2.28 | | 76.3 | 73.8 |
| $[N_8]$ (pcs./wt % · $\mu m^2$) | 2.52 | 2.34 | 1.67 | 5.17 | | 0.025 | 0.029 |
| $[N_8/N_{81}]$ value | 890 | 827 | 590 | 1827 | | 8.83 | 10.3 |
| Avevage layer thickness (nm) | 8.6 | 7.8 | 13.6 | 2.3 | | 2650 | 2320 |
| Ratio of 5 nm or less thick layers | 59 | 50 | 32 | 89 | | 0 | 0 |
| $[I_8/I_{81}] \times 10^{-2}$ | 14.3 | 16.7 | 20.2 | 0 | | 92.9 | 91.3 |
| Basal spacing (nm) | 6.8 | 6.5 | 4.8 | >10 | | 1.3 | 1.3 |
| Load deflection temperature (° C.) | 161 | 162 | 156 | 164 | 134 | 134 | 135 |
| Flexural strength (MPa) | 148 | 151 | 148 | 156 | 107 | 108 | 109 |
| Flexural elastic modulus (MPa) | 3680 | 3760 | 3050 | 3980 | 2210 | 2220 | 2230 |
| Surface finishing | ○ | ○ | ○ | ○ | ○ | Δ | Δ |

INDUSTRIAL APPLICABILITY

According to the present invention, the silane-treated foliated phyllosilicate (B) obtained by introducing the organosilane compound (B2) into the swellable layered silicate (B1) after the basal spacing of the swellable layered silicate (B1) has been expanded is used as a filler for the thermoplastic resin composition. When the silane-treated foliated phyllosilicate is included in the thermoplastic resin composition (C), layers of the silane-treated foliated phyllosilicate (B) are exfoliated, further expanding the basal spacing. As a result, the silane-treated foliated phyllosilicate (B) exists in the thermoplastic resin composition (C) as a number of very fine layers dispersed independently from one another. Thus, according to the present invention, the thermoplastic resin composition (C) excellent in various properties such as the mechanical properties (elastic modulus, strength, tenacity, etc.), heat resistance, and the surface appearance of molded products can be obtained only by adding a small amount of the silane-treated foliated phyllosilicate (B).

In the conventional technique, the swellable layered silicate (B1) in the state of an aggregate structure where layers are stratified with one another, or the swellable layered silicate (B1) in the state of an aggregate structure treated with the organosilane compound (B2) is used as a filler for the thermoplastic resin composition. Accordingly, the elastic modulus and the heat resistance are not improved by adding a small amount of such a filler. On the contrary, if a large amount of the filler is added, the surface finishing, the strength, the impact strength, and the like of the resultant molded product are degraded. Balancing these properties has been difficult.

What is claimed is:

1. A thermoplastic resin composition containing a thermoplastic resin (A) and a silane-treated foliated phyllosilicate (B), wherein the composition is prepared by:
   expanding a basal spacing of a swellable layered silicate (B1) in a dispersion medium;
   introducing a organosilane compound (B2) represented by general formula (I):

$$Y_n SiX_{4-n} \quad (I)$$

wherein n denotes an integer of 0 to 3, Y denotes independently a substituted or non-substituted hydrocarbon group having 1 to 25 carbon(s), and X denotes independently a hydrozable group or a hydroxyl group, into the swellable layered silicate (B1) in the dispersion medium to prepare a dispersion,
   mixing the dispersion with a monomer of the thermoplastic resin (A) to prepare a mixture, and
   polymerizing the polymer, wherein:
   a value $\{R_{B300}\}$ is 20% or more than the value $\{R_{B300}\}$ is defined as a rate of layers of the silane-treated foliated phyllosilicate (B) of which equivalent area circle diameter $\{D\}$ is 300 nm or less.

2. The thermoplastic resin composition of claim 1, wherein the thermoplastic resin (A) is at least one type selected from the group consisting of a thermoplastic polyester resin and a polycarbonate resin.

3. The thermoplastic resin composition of claim 1, wherein the swellable layered silicate (B1) is at least one type selected from the group consisting of smectite clay and swellable mica.

4. The thermoplastic resin composition of claim 1, wherein a content of the silane-treated foliated phyllosilicate (B) is 0.1 to 100 parts by weight with respect to 100 parts by weight of the thermoplastic resin (A).

5. The thermoplastic resin composition of claim 1, wherein an ash content originating from the silane-treated foliated phyllosilicate (B) is 0.1 to 50% by weight.

6. The thermoplastic resin composition of claim 1, wherein the value $\{R_{B300}\}$ is 50% or more.

7. The thermoplastic resin composition of claim 1, wherein a value $\{D_B\}$ is 500 nm or less when the $\{D_B\}$ is defined as an average value of the equivalent area circle diameters of the silane-treated foliated phyllosilicate (B).

8. The thermoplastic resin composition of claim 1, wherein an average thickness of the foliated layers of the silane-treated foliated phyllosilicate (B) dispersed in the thermoplastic resin composition is 20 nm or less.

9. The thermoplastic resin composition of claim 1, wherein 20% or more of layers of the silane-treated foliated phyllosilicate (B) dispersed in the thermoplastic resin composition has a layer thickness of 5 nm or less.

10. The thermoplastic resin composition of claim 1, wherein:

Y of the organosilane compound (B2) is independently a hydrocarbon group having 1 to 25 carbon atoms;

one or more of the hydrocarbon groups have one or more functional groups selected from the group consisting of an ester group, an ether group, an epoxy group, and an amino group; and X is one or more groups independently selected from the group consisting of an alkoxy group, an alkenyloxy group, a ketoxime group, an amino group, an aminoxy group, an amido group, and a hydroxyl group.

11. The thermoplastic resin composition of claim 1, wherein:

the organosilane compound (B2) is represented by general formula (II):

$$YSiX_3 \tag{II}$$

Y is selected from the group consisting of methacryloxypropyl group, a (polyoxyethylene)propyl group, a glycidoxypropyl group, an aminopropyl group, and a γ-(2-aminoethyl)aminopropyl group; and X denotes one or more groups independently selected from the group consisting of an alkoxy group, an alkenyloxy group, a ketoxime group, an amino group, an aminoxy group, an amido group, and a hydroxyl group.

* * * * *